(12) United States Patent
Chen et al.

(10) Patent No.: US 8,607,013 B2
(45) Date of Patent: Dec. 10, 2013

(54) PROVIDING VMM ACCESS TO GUEST VIRTUAL MEMORY

(75) Inventors: Xiaoxin Chen, Cupertino, CA (US);
Carl A. Waldspurger, Palo Alto, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 1350 days.

(21) Appl. No.: 12/261,147

(22) Filed: Oct. 30, 2008

(65) Prior Publication Data

US 2009/0113110 A1 Apr. 30, 2009

Related U.S. Application Data

(60) Provisional application No. 60/983,797, filed on Oct. 30, 2007.

(51) Int. Cl.
*G06F 12/00* (2006.01)
*G06F 13/00* (2006.01)
*G06F 13/28* (2006.01)

(52) U.S. Cl.
USPC ............... 711/163; 711/6; 711/206; 711/221; 718/104

(58) Field of Classification Search
USPC ........................................ 711/163
See application file for complete search history.

(56) References Cited

U.S. PATENT DOCUMENTS

| | | | |
|---|---|---|---|
| 4,787,031 A | 11/1988 | Karger et al. | |
| 5,230,069 A | 7/1993 | Brelsford et al. | |
| 5,555,385 A | 9/1996 | Osisek | |
| 6,055,617 A | 4/2000 | Kingsbury | |
| 7,111,145 B1 * | 9/2006 | Chen et al. | 711/206 |
| 7,761,706 B2 | 7/2010 | Lambert | |
| 8,132,003 B2 | 3/2012 | Durham et al. | |
| 8,140,820 B2 * | 3/2012 | Mansell et al. | 711/202 |
| 2004/0083481 A1 * | 4/2004 | Shultz et al. | 719/312 |
| 2005/0273783 A1 | 12/2005 | Tankov et al. | |
| 2007/0005992 A1 | 1/2007 | Schluessler et al. | |
| 2008/0022129 A1 | 1/2008 | Durham et al. | |
| 2008/0077767 A1 | 3/2008 | Khosravi et al. | |
| 2008/0133875 A1 * | 6/2008 | Cohen et al. | 711/207 |
| 2008/0155168 A1 * | 6/2008 | Sheu et al. | 711/6 |
| 2009/0113111 A1 * | 4/2009 | Chen et al. | 711/6 |
| 2009/0113216 A1 * | 4/2009 | Chen et al. | 713/189 |
| 2009/0113424 A1 * | 4/2009 | Chen et al. | 718/1 |
| 2009/0113425 A1 * | 4/2009 | Ports et al. | 718/1 |
| 2011/0131388 A1 * | 6/2011 | Chen et al. | 711/206 |

OTHER PUBLICATIONS

Borders et al.: "Securing Sensitive Content in a View-Only File System"; 2006; ACM, pp. 27-36.
Garfinkel et al.: "Terra: A Virtual Machine-Based Platform for Trusted Computing"; 2003; ACM, pp. 193-206.
Ta-Min et al.: "Splitting Interfaces: Making Trust Between Applications and Operating Systems Configurable"; 2006; USENIX, pp. 279-292.
Zhao et al.: "Towards Protecting Sensitive Files in a Compromised System"; 2005; IEEE, pp. 1-8.

* cited by examiner

*Primary Examiner* — Aimee Li
*Assistant Examiner* — Prasith Thammavong

(57) ABSTRACT

A virtual-machine-based system provides a mechanism for a virtual machine monitor (VMM) to process a hypercall received from an application running in the virtual machine (VM). A hypercall interface causes the virtual memory pages, needed by the VMM to process the hypercall, to be available to the VMM. In one embodiment, when virtual memory pages needed by the VMM to process the hypercall are not available to the VMM, the application is caused to access the needed pages, in response to which the required virtual memory becomes available to the VMM.

34 Claims, 12 Drawing Sheets

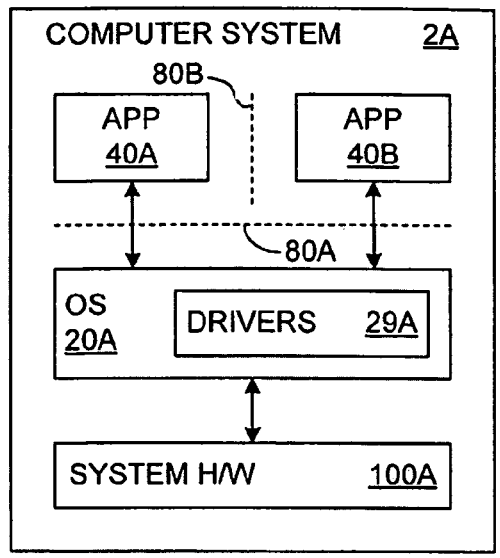
FIG. 1
(PRIOR ART)
FIG. 2 (PRIOR ART)
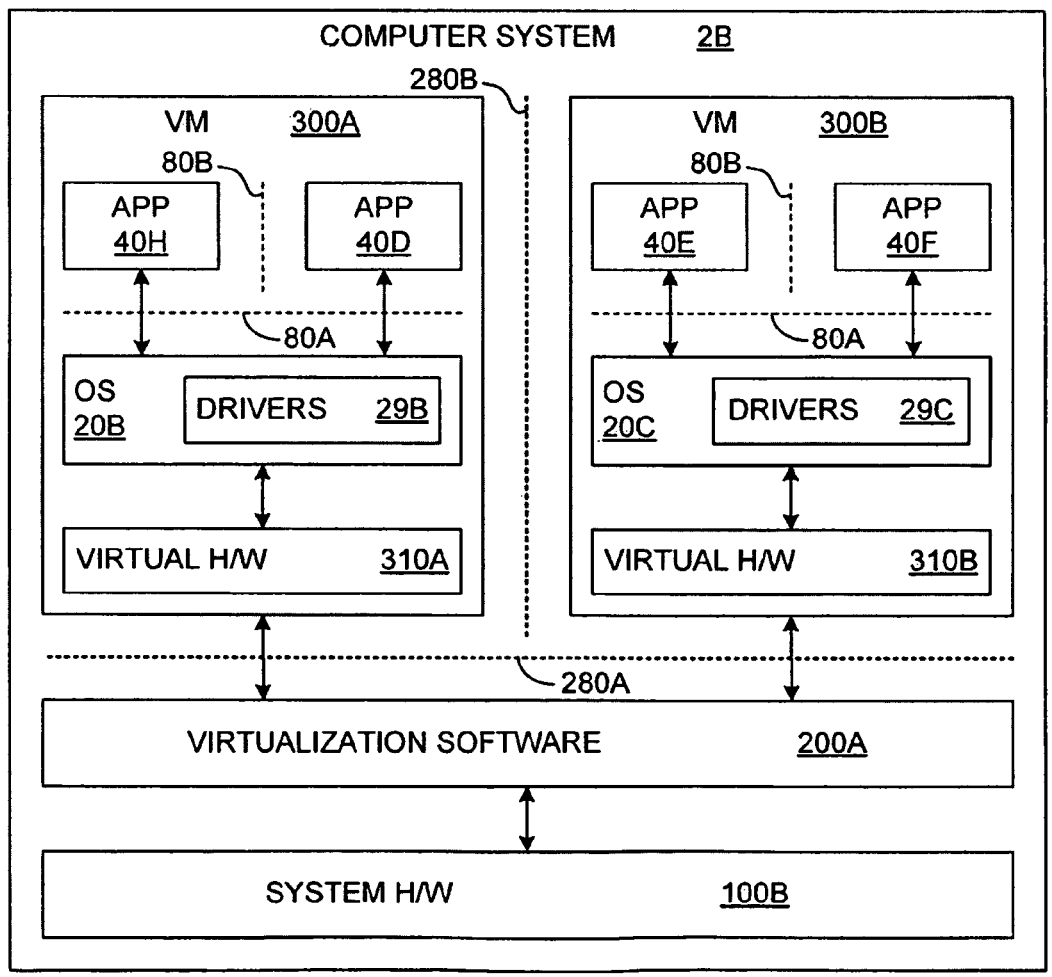

PROVIDING VMM ACCESS TO GUEST VIRTUAL MEMORY

RELATED APPLICATIONS

This application claims priority from provisional patent application Ser. No. 60/983,797, filed 30 Oct. 2007, entitled "A Virtualization-Based Approach To Retrofitting Protection In Commodity Operating Systems," the entire contents of which is hereby incorporated by reference herein.

This application is related to:

U.S. application Ser. No. 12/261,159 entitled "Secure Identification Of Execution Contexts," filed on even date herewith, the entire contents of which is hereby incorporated by reference for all purposes;

U.S. application Ser. No. 12/261,194 entitled "Cryptographic Multi-Shadowing With Integrity Verification," filed on even date herewith, the entire contents of which is hereby incorporated by reference for all purposes;

U.S. application Ser. No. 12/261,623 entitled "Transparent VMM-Assisted User-Mode Execution Control Transfer," filed on even date herewith, the entire contents of which is hereby incorporated by reference for all purposes; and U.S. application Ser. No. 12/261,722 entitled "Transparent Memory-Mapped Emulation of I/O Calls," filed on even date herewith, the entire contents of which is hereby incorporated by reference for all purposes.

FIELD OF THE INVENTION

One or more embodiments of the present invention relate to providing a hypercall interface that operates to assure that memory access needed by a VMM in order for the VMM to process the hypercall is available.

BACKGROUND OF THE INVENTION

Commodity operating systems (OS) are used in amazingly diverse environments, from ubiquitous use in the home, to service in commercial, government, and military settings. These systems are tasked with handling all manner of sensitive data, from individual passwords and cryptokeys, to databases of social security numbers, to sensitive documents, and voice traffic.

The security of known commodity operating systems, however, is less than ideal. While some facets of their security will continue to improve, it is believed that competitive pressures to provide richer functionality and retain compatibility with existing applications will keep the complexity of such systems high and, therefore, their security assurance low.

Over the years, a variety of techniques has been used for executing multiple software modules within a computer system, thereby providing some amount of security. Early computer systems could execute multiple software programs, but they could only execute one program at a time. Such computers might load one program into memory and execute it to completion or other termination, before proceeding to a subsequent program that would then be loaded into memory and executed. As another example, various multitasking operating systems enable multiple programs (or selected portions thereof) to be loaded into memory at one time and executed in an alternating manner, according to a scheduling algorithm. Also, some processors include multithreading capabilities that enable multiple threads of one or more programs to be executed simultaneously on a single processor. Finally, multiprocessor computer systems have also become commonplace, in which each processor can execute one or more threads all at the same time.

Many computer systems generally attempt to isolate the code and data of each different software module from the code and data of any other software module within the computer system. As a result, one software module then cannot interfere with the execution of another software module by altering the latter's code or data. Such isolation may be provided for code and/or data that is stored on a hard drive (or other secondary data storage means) and/or that is resident in main memory (or other primary data storage means). The term "data" is generally used in a broad sense, to include data that is operated on by the instructions (code) of a software module as well as the contents of a stack and any other possible forms of data that are associated with a software module.

As one example of the isolation of code and data, many systems implement a virtual addressing mechanism, in which different software modules within the system have different virtual address spaces, with each virtual address space generally being mapped to different portions of the physical address space of the computer system, so that the virtual addresses of a given software module are generally only mapped to physical addresses that contain the code or data of that particular software module. Virtual addressing mechanisms are well understood by one of ordinary skill in the art. A given software module may attempt to access every memory location in its own virtual address space, accessing every memory location to which it has access, and it will still only be able to access its own code and data (assuming that there is no shared memory). Thus, providing a virtual addressing mechanism provides some isolation between the code and data of multiple software modules in a computer system and, therefore, provides some security.

Various other protection mechanisms may also be implemented in such computer systems to isolate the code and/or data of multiple software modules from one another.

The x86 architecture provides two primary memory protection mechanisms that may be used by an OS (or other system software) to try to isolate the code and data of multiple tasks or processes that execute on the processor, namely, a segmentation mechanism and a paging mechanism. Windows and Linux use the paging mechanism, but they generally do not take advantage of the segmentation mechanism. Instead, these OSs define segments that include the entire addressable range of the processor, so that the segmentation protection mechanism becomes ineffective in providing isolation between the code and data of multiple tasks. Thus, for simplicity, this discussion focuses on the paging mechanism of the x86 processor, which implements a virtual addressing mechanism. The invention, however, is not limited to implementations using the x86 processor, or implementations using similar memory protection mechanisms.

Generally, for Windows and Linux, different user processes are generally given different virtual address spaces. The OS creates a different set of page tables (and a page directory) for each virtual address space, which maps the respective virtual addresses to physical addresses. Thus, the page tables for a given user process map that process's virtual addresses to the physical addresses that contain the code and data for that process. The page tables for the user processes also contain mappings for code and data of the OS, but the user processes cannot use these mappings because the user processes are executed at a Current Privilege Level (CPL) of 3 and these mappings are set to require a supervisor, i.e., a higher, privilege level (a CPL of 0, 1 or 2). Otherwise, the page tables for a given user process generally only contain mappings to physical memory pages that contain that process's code and data. Therefore, a user process can generally only access its own code and data. Executing the user processes at a CPL of 3 also prevents the processes from modifying their own page tables. Otherwise, a process could add entries to its page tables that map to any physical address in the system, so that the process could give itself access to the code and data of other software modules, including other user processes and the OS.

Windows and Linux generally provide adequate protection for the software modules in a computer system, so long as all of the software modules are well designed and well behaved, i.e., they are not attempting to circumvent the protection mechanism. Thus, many processes may be running concurrently in such a computer system, with the OS giving each process a share of the system resources, including processor time, memory space and hard disk space, without any of the processes interfering with the code or data of the other processes.

As shown in FIG. 1, a simple computer system 2A has multiple software modules. The computer system 2A includes system hardware 100A, an OS 20A, a first application 40A and a second application 40B. The system hardware 100A may be conventional hardware based on, for example, the x86 platform, and the OS 20A may be, for example, Windows or Linux. The applications 40A and 40B may be any applications designed to run on the system hardware 100A and the OS 20A. The OS 20A also includes a set of drivers 29A, which may be conventional drivers for the OS 20A, possibly including one or more drivers from a company that is different from the OS vendor (a third party vendor).

The OS 20A, in conjunction with the system hardware 100A, attempts to isolate the code and data of the applications 40A and 40B from one another. For example, the OS 20A and the system hardware 100A may implement a virtual addressing mechanism, as described above. As illustrated in FIG. 1, implementing such a protection mechanism may be characterized as establishing an isolation barrier 80B between the applications 40A and 40B, preventing (or at least hindering) one application from accessing the code and data of the other application. There may also be some code and/or data that is shared explicitly or transparently between the applications 40A and 40B. Techniques are known for allowing such sharing of code and data, while maintaining isolation between the applications 40A and 40B. For example, the OS 20A may mark physical memory pages that contain shared code or data as read only, such as when using a copy-on-write (COW) technique.

The isolation barrier 80B may be referred to as an "OS isolation barrier" because it is implemented by the OS 20A, in conjunction with the system hardware 100A. The OS 20A, again in conjunction with the system hardware 100A, also establishes an OS isolation barrier 80A between the OS 20A and all applications in the system, including the applications 40A and 40B, so that the applications are prevented (or hindered) from directly accessing the code and data of the OS 20A. In the case of a Windows or Linux OS running on an x86 platform, as above, the OS isolation barrier 80A is established by executing the applications in the system at a CPL of 3 and requiring a supervisor privilege level to access memory pages containing the code and data of the OS 20A.

Although the Windows and Linux OSs provide adequate isolation between software modules for computer systems that contain only well designed and well behaved software modules, malicious software modules have been known to wreak havoc in such computer systems by circumventing these protection mechanisms. In particular, such malicious software modules have been known to breach the OS isolation barriers 80B and 80A, and corrupt the code and/or data of other applications in the system, and/or of the OS itself. Numerous security vulnerabilities have been discovered in the Windows OSs and in the Linux distributions, and many of these vulnerabilities have been exploited by hackers using different types of malicious software, such as viruses, worms, etc. Poorly designed or implemented software as well as misconfigured, though well-written, software may inadvertently bypass these protection mechanisms too and may, unintentionally, wreak havoc in a computer system. While the present description generally relates to protecting against malicious software, it also applies to protecting against software that inadvertently has the same or similar effects as intentionally malicious software.

As is too well-known, hackers exploit the vulnerabilities of today's systems for a variety of reasons and with a variety of goals, some being relatively benign and others being quite destructive or disruptive. As one example, a malicious software module may be written and deployed that searches for sensitive data on a computer's hard drive or in its memory and transmits any such sensitive data back to the hacker that launched the malicious code.

Security threats and data breaches have been gaining greater notoriety, and it is widely accepted that something should be done to improve the security of the ubiquitous personal computer. In particular, there is a recognized need to improve the security for the vast number of computers based on the x86 architecture. Many believe that software changes alone will not provide adequate protection. Accordingly, many different companies are working toward solutions that involve substantial changes to both the system hardware and the system software, i.e., the operating system, of a computer system. Many such security measures, however, require substantial changes to application level software as well.

With respect to the ubiquitous x86 platform, much of the work being done in this area requires substantial hardware changes or an entirely new hardware platform. This work would also require substantial changes to existing software platforms, including system software and possibly application software. Applications in some of these implementations might also have limited access to input/output devices because of a limited supply of trusted device drivers.

The amount of money that is invested in computer hardware and software based on the x86 architecture throughout the world is enormous. Many individuals, businesses, schools, governments and other organizations will be reluctant to scrap their current x86 systems, along with all the software that currently runs on x86 systems, and replace them with new technology. Even if a new, more secure and widely accepted hardware platform were available today, it would still take a long time for the new hardware to become anywhere near as widespread as the x86 platform is today. In the meantime, a large number and proportion of computers would remain vulnerable to the security threats described above.

Notwithstanding the foregoing, there are some proposed security measures that may be implemented primarily in software. In particular, there are some such measures that use virtualization technology to create multiple virtual machines (VMs), where different software modules run in different VMs. It is widely recognized that a well-designed and implemented virtualization layer can generally provide much greater isolation between multiple VMs than a general OS can provide between multiple software modules.

A general computer system 2B, referring now to FIG. 2, is described in co-pending application Ser. No. 11/584,178, filed 20 Oct. 2006, titled "Isolating Data within a Computer System Using Private Shadow Mappings," herein incorporated by reference in its entirety for all purposes, in which multiple VMs are implemented to isolate multiple software modules from one another. The computer system 2B includes system hardware 100B, which may be conventional hardware, such as hardware based on the x86 platform. The system hardware 100B may be substantially the same as the system hardware 100A of FIG. 1, or it may be substantially different. Virtualization software 200A executes on the system hardware 100B and supports a plurality of VMs, such as a first VM 300A and a second VM 300B, in a known manner. Virtualization software 200A may comprise a virtual machine monitor (VMM,) for example, such as a VMM as implemented in a virtualization product of VMware, Inc. of Palo Alto, Calif. Such a VMM and other possible units of the virtualization software 200A are described in greater detail below.

In supporting the VM 300A, the virtualization software 200A virtualizes a virtual system hardware 310A, which may be based on an existing hardware platform, such as the x86 platform. An OS 20B, along with a set of drivers 29B, runs on the virtual system hardware 310A. The OS 20B may be any OS designed to run on the hardware platform virtualized in the virtual hardware 310A. For example, if the virtual hardware 310A is based on the x86 platform, the OS 20B may be, for example, a Windows OS, Solaris OS, Mac OS X, Novell Netware, or a Linux OS. The set of drivers 29B may be conventional drivers for the OS 20B. A first application 40H and a second application 40D run on the OS 20B. The applications 40H and 40D may be any applications designed to run on the platform of the virtual hardware 310A and the OS 20B.

Similar to the OS 20A of FIG. 1, the OS 20B, in conjunction with the virtual system hardware 310A, attempts to isolate the code and data of the applications 40H and 40D from one another, establishing an OS isolation barrier 80B between the applications 40H and 40D. Also similar to the OS 20A of FIG. 1, the OS 20B, again in conjunction with the virtual system hardware 310A, also establishes an OS isolation barrier 80A between the OS 20B and all applications in the VM 300A, including the applications 40H and 40D. Thus, the VM 300A may be substantially the same as the computer system 2A, except that the virtual system hardware 310A is virtual hardware, virtualized by the virtualization software 200A, instead of physical hardware.

In supporting the VM 300B, the virtualization software 200A virtualizes a virtual system hardware 310B in a like manner as done for the VM 300A.

The virtualization software 200A isolates the VMs in the computer system 2B from one another. For example, the virtualization software 200A allows software within the VM 300A to access portions of physical memory in the system hardware 100B and it allows software within the VM 300B to access other portions of the physical memory. The virtualization software 200A maps attempted memory accesses from the respective VMs 300A and 300B to different portions of the physical memory, ensuring that no memory address generated by software in one VM can access code or data of another VM. In a similar manner, the virtualization software 200A maps attempted hard disk accesses from the respective VMs 300A and 300B to different portions of one or more hard disks in the system hardware 100B, ensuring that one VM cannot access the hard disk space of another VM.

The virtualization software 200A also takes other precautions to isolate the VMs in the computer system 2B from one another, and from the virtualization software 200A, itself. For example, U.S. Pat. No. 7,281,102 to Agesen et al., "Restricting Memory Access to Protect Data when Sharing a Common Address Space", ("the '102 patent"), describes methods that may be used to enable a VMM to occupy a portion of a linear address space of a VM, while preventing the VM from accessing the memory of the VMM. There are also various other methods that enable virtualization software to coexist with VMs in a virtual computer system, while protecting or isolating the virtualization software from software within the VMs. The virtualization software 200A may prevent software within the VMs 300A and 300B from directly accessing a Direct Memory Access (DMA) device to prevent the possibility that the DMA device could be used to access either the hard disk space or the memory of other VMs or of the virtualization software itself.

Thus, the virtualization software 200A, in conjunction with the system hardware 100B, may be said to establish a first isolation barrier 280B between the VMs 300A and 300B and a second isolation barrier 280A between the virtualization software 200A and all VMs in the computer system 2B, including the VMs 300A and 300B. The isolation barriers 280A and 280B may be referred to as "virtualization barriers" because they are implemented by the virtualization software 200A, in conjunction with the system hardware 100B. The isolation barriers 280A and 280B may also be referred to as virtualization barriers because they are established through the virtualization of hardware resources, such as the virtualization of system memory.

Virtualization techniques may provide better security and more effective isolation between multiple software modules than a general OS may provide. Thus, the virtualization barriers 280A and 280B of FIG. 2 can generally provide much better isolation between the multiple VMs 300A and 300B and the virtualization software 200A than the OS isolation barriers 80A and 80B of FIG. 1 provide between the multiple applications 40A and 40B and the OS 20A. Although computer systems that establish multiple VMs and that run different software modules within the different VMs generally provide better isolation for the software modules than do general OSs, such virtual computer systems have other limitations.

As an example of one limitation, if the software within a VM becomes corrupted by malicious software, the same problems described above relative to non-virtualized computer systems can occur within the affected VM. The software modules within the particular VM may be compromised by the malicious software. Approaches to retrofitting operating systems to possess higher-assurance security execution environments using multiple virtual machines, new operating systems, secure co-processors, or substantial changes to the processor architecture have been explored. Unfortunately, these may demand not insignificant changes in how applications are written and used, and how OS resources are managed. Such departures from standard operation pose a substantial barrier to adoption of these known approaches.

SUMMARY OF THE INVENTION

In one embodiment, a computer system comprising a virtual machine monitor (VMM) running on system hardware and supporting a virtual machine (VM) having a first application and a guest OS running therein, a method of providing the VMM with access to virtual memory is provided. The method comprises: the VMM receiving a hypercall from the first application running in the VM; the VMM determining if it has access to a first virtual memory address identified in the hypercall; if the VMM determines that it does not have access to the first virtual memory address identified in the hypercall, the VMM returning a first message to the first application with an identification of the first virtual memory address to which the VMM does not have access; the first application receiving the first message returned from the VMM and implementing an operation to cause the identified first virtual memory address to be accessible by the VMM; and the first application re-invoking the hypercall to the VMM.

In another embodiment, a virtual machine (VM) has a first application and a guest OS running therein, and a method of providing the VMM with access to virtual memory comprises: the first application preparing to issue a hypercall to the VMM; prior to issuing the hypercall, the first application causing a page table to have one or more valid mappings for one or more portions of an address space of the application which the VMM has access to in order for the VMM to process the hypercall; and the first application issuing the hypercall to the VMM, wherein the VMM accesses the provided one or more valid mappings to process the hypercall.

In yet another embodiment, a method of providing the VMM with access to virtual memory comprises: the VMM receiving a hypercall instruction from the first application; the VMM examining registers corresponding to the hypercall instruction and determining a corresponding hypercall command and one or more hypercall arguments; the VMM determining if one or more hypercall arguments comprises a first virtual memory address indicating a location of a memory buffer; if the VMM determines that one or more hypercall arguments comprises a first virtual memory address indicating a location of a memory buffer, the VMM determining if the memory buffer is mapped by a page table to which the VMM has access; if the VMM determines that the memory buffer is not mapped by the page table, the VMM identifying to the first application the first virtual memory address; the first application receiving the identification of the virtual memory address from the VMM and implementing an operation to cause the identified virtual memory address to be mapped by the page table and accessible by the VMM; and the first application re-invoking the hypercall instruction to the VMM.

BRIEF DESCRIPTION OF THE DRAWINGS

FIG. 1 illustrates a computer system running multiple software modules on a general operating system;

FIG. 2 illustrates a virtual computer system with multiple virtual machines (VMs) for running multiple software modules;

DETAILED DESCRIPTION

Figure 3:
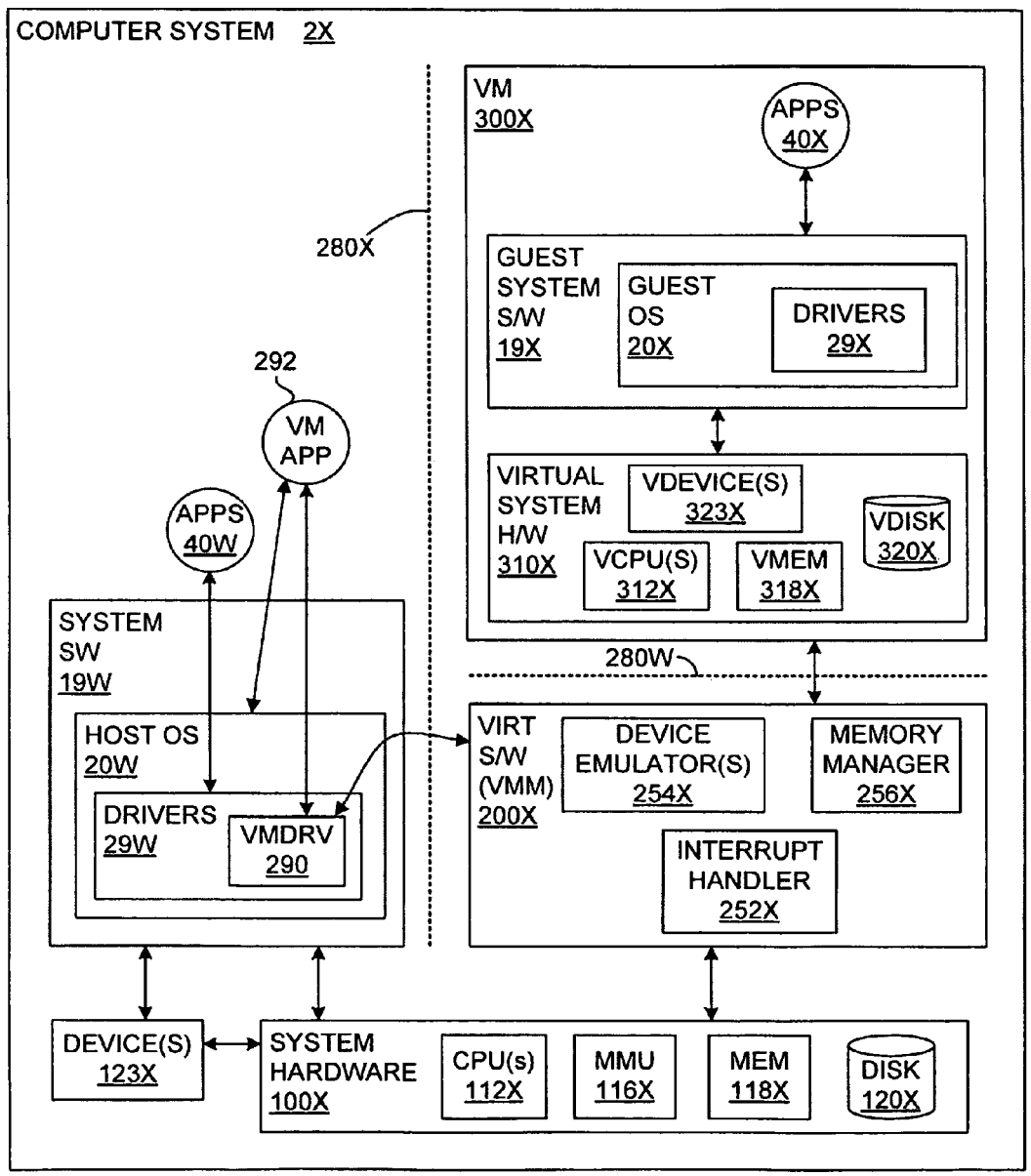
FIG. 3 illustrates a virtual computer system installed on a host platform, with a virtual machine monitor (VMM) at the same system level as the host operating system.

Application security is often limited by the poor assurance of commodity operating systems. A virtual-machine-based system in accordance with an embodiment of the present invention may protect the privacy and integrity of application data, even in the event of a total OS compromise. Embodiments of the present invention present an application with a normal view of its resources, but the OS with an encrypted view of those resources. This allows the operating system to carry out the complex tasks of managing an application's resources, without allowing it to read or modify them. Thus, embodiments of the present invention offer defenses against application data being compromised.

Embodiments of the present invention build on "multi-shadowing," a mechanism that presents different views of "physical" memory, depending on the context performing the access. This approach offers an additional dimension of protection beyond the hierarchical protection domains implemented by traditional operating systems and processors.

Many embodiments of the present invention do not replace the role of an existing OS for managing resources. Instead, the isolation capabilities of the virtualization layer are extended to allow protection of entities inside a virtual machine.

The technique of "multi-shadowing" leverages the extra level of indirection offered by memory virtualization in a virtual machine monitor (VMM) to provide a protection layer. Conceptually, as will be described below, a typical VMM maintains a one-to-one mapping from guest "physical" addresses to actual machine addresses. Multi-shadowing replaces this with a one-to-many, context-dependent mapping, providing multiple views of guest memory. Embodiments of the present invention extend multi-shadowing to present an application with a cleartext view of its pages, and the OS with an encrypted view, a technique referred to as "cloaking." Encryption-based protection allows resources to remain accessible to the OS, yet secure, permitting the OS to manage resources without compromising application privacy or integrity.

Multi-Shadowed Cloaking

Prior to the detailed description of embodiments of the present invention, the operation of traditional virtualized systems will be briefly explained, followed by an explanation of how these systems are extended to support multi-shadowing according to embodiments of the present invention. The manner in which multi-shadowing is coupled with encryption to implement cloaking, providing both encrypted and unencrypted views of memory is then discussed.

Discussion of Virtualization

As is well known in the art, a virtual machine (VM) is a software abstraction, i.e., a "virtualization" of an actual or an abstract physical computer system. The VM runs as a "guest" on an underlying "host" hardware platform. Guest software, such as a guest OS and guest applications, may be loaded onto the virtual computer for execution. The guest OS may, but need not be, the same as the OS or other system software running at the system level in the host. For example, a Windows OS may run in the VM even though the OS used to handle actual I/O (input/output), memory management, etc., on the host might be a Linux OS. As long as a suitable interface is provided between the VM and the host platform, a user of a VM need not even be aware that she is not using a "real" computer, that is, a system with hardware dedicated exclusively to her use. The existence of the underlying host can be made transparent to a user of the VM and to the guest software itself.

A Hosted Virtual Computer System

FIG. 3 illustrates the main components of a computer system 2X that supports a VM 300X, as generally implemented in the Workstation virtualization product of VMware, Inc. As in conventional (non-virtualized) computer systems, both system hardware 100X and system software 19W are included. The system hardware 100X includes CPU(s) 112X, which may be a single processor, or two or more cooperating processors in a known multiprocessor arrangement. The system hardware also includes system memory 118X, one or more disks 120X, and some form of Memory Management Unit (MMU) 116X. One of ordinary skill in the art will understand that the system may not contain any disks. In other words, the system may instead use network-attached storage (NAS), such as a remote file server, i.e., one using NFS (Network File System) or CIFS (Common Internet File System) protocols, or a remote storage array via a storage-area network (SAN), or via a standard network, e.g., using the iSCSI (Internet Small Computer System Interface) protocol. Further, flash memory could be used to replace the disks. As is understood in the field of computer engineering, the system hardware also includes, or is connected to, conventional registers, interrupt handling circuitry, a clock, etc., which, for the sake of simplicity, are not shown in the figure.

The system software 19W either is or at least includes an operating system 20W, which has drivers 29W as needed for controlling and communicating with various devices 123X, and usually with the disk 120X as well. Conventional applications 40W, if included, may be installed to run on the hardware 100X via the system software 19W and any drivers needed to enable communication with those devices.

The virtual machine (VM) 300X—also known as a "virtual computer"—is a software implementation of a complete computer system. In the VM, the physical system components of a "real" computer are emulated in software, that is, they are virtualized. Thus, the VM 300X will typically include virtualized ("guest") system hardware 310X, which in turn includes one or more virtual CPUs 312X (VCPU), virtual system memory 318X (VMEM), one or more virtual disks 320X (VDISK), and one or more virtual devices 323X (VDEVICE), all of which are implemented in software using known techniques to emulate the corresponding components of an actual computer. It should be noted, however, that a VDISK and a VDEVICE are typically included but are not strictly necessary. The concept, design and operation of virtual machines are well known in the field of computer science.

The VM 300X also includes system software 19X, which may include a guest operating system 20X, which may, but need not, simply be a copy of a conventional, commodity OS, as well as drivers 29X as needed, for example, to control the virtual device(s) 323X. Note that a disk—virtual or physical—is also a "device," but is usually considered separately because of its essential role. Of course, most computers are intended to run various applications, and a VM is usually no exception. Consequently, by way of example, FIG. 3 illustrates one or more applications 40X installed to run on the guest OS 20X; any number of applications, including none at all, may be loaded for running on the guest OS, limited only by the requirements of the VM. Software running in the VM 300X, including the guest OS 20X and the guest applications 40X, is generally referred to as "guest software."

Note that although the virtual hardware "layer" 310X will be a software abstraction of physical components, the VM's system software 19X may be the same as would be loaded into a hardware computer. The modifier "guest" is used here to indicate that the VM, although it acts as a "real" computer from the perspective of a user and guest software, is actually just computer code that is executed on the underlying "host" hardware and software platform 100X, 19W. Thus, for example, I/O to a virtual device 323X will actually be carried out by I/O to a corresponding hardware device 123X, but in a manner transparent to the VM.

Some interface is usually required between the VM 300X and the underlying "host" hardware 100X, which is responsible for actually executing VM related instructions and transferring data to and from the actual, physical memory 118X and other system hardware 100X. The interface between the VM and the underlying host system is often referred to as a Virtual Machine Monitor (VMM). As used in this patent, the term VMM should not be interpreted as being limited in any way to or by existing virtualization software that is referred to as a VMM. Instead, the term VMM should be interpreted broadly as virtualization software that supports the operation of a virtual machine, whether such virtualization software is referred to as a VMM, a hypervisor, or if some other terminology is used; or, in the event that some virtualization functionality is implemented or supported in hardware, the term VMM may be interpreted broadly as virtualization logic that supports the operation of a virtual machine.

A VMM is usually a relatively thin layer of software that runs directly on top of a host, such as the system software 19W, or directly on the hardware, and virtualizes the resources of the hardware platform. FIG. 3 shows virtualization software 200X, which may be implemented as a VMM, running directly on the system hardware 100X. The virtualization software 200X is also referred to as a VMM 200X herein, although it may alternatively comprise other virtualization software that may not be considered or called a VMM. The VMM 200X will typically include at least one device emulator 254X, which may also form the implementation of the virtual device(s) 323X. The interface exported to the respective VM is usually such that the guest OS 20X cannot determine the presence of the VMM. The VMM also usually tracks and either forwards (to the host OS 20W) or itself schedules and handles all requests by its VM for machine resources, as well as various faults and interrupts. FIG. 3 therefore illustrates an interrupt (including fault) handler 252X within the VMM. The VMM also includes a memory manager 256X. The general features of VMMs are well known and are therefore not discussed in further detail here.

A single VM 300X is illustrated in FIG. 3 merely for the sake of simplicity; in many installations, there will be more than one VM installed to run on the common hardware platform; all may have essentially the same general structure, although the individual components need not be identical. Also, as shown in FIG. 3, a single VMM 200X is the interface for the single VM 300X. It would also be possible to include the VMM as part of its respective VM. Although the VMM is usually completely transparent to the VM, the VM and VMM may be viewed as a single module that virtualizes a computer system. The VM and VMM are shown as separate software entities in the figures merely for the sake of clarity. Moreover, it would also be possible to use a single VMM to act as the interface for more than one VM.

In the system illustrated in FIG. 3, both the host OS and the VMM are installed at system level, meaning that they each run at the greatest privilege level and can therefore independently modify the state of the hardware processor(s). For I/O to at least some devices, however, the VMM may issue requests via the host OS 20W. To make this possible, a special driver VMDRV 290 is installed just as any other driver within the host OS 20W is installed and exposes a standard API to a user-level application VMAPP 292. When the system is in the VMM context, meaning that the VMM is taking exceptions, handling interrupts, etc., but the VMM wishes to use the existing I/O facilities of the host OS, the VMM calls the driver VMDRV 290, which then issues calls to the application VMAPP 292, which then carries out the I/O request by calling the appropriate routine in the host OS.

A line 280X symbolizes the boundary between the virtualized (VM/VMM) and non-virtualized (host software) "worlds" or "contexts." The driver VMDRV 290 and application VMAPP 292 thus enable communication between the worlds. The boundary 280X may also be characterized as a "virtualization barrier", as that term is used above. The virtualization barrier 280X, however, does not provide as complete a barrier, or as secure a barrier, between the host OS 20W and the VM 300X as the virtualization barrier 280B provides between the VM 300A and the VM 300B shown in FIG. 2. This is primarily because the system software 19W has direct access to the system hardware 100X, including all of the memory 118X and the disk 120X, including, in particular, the memory and disk space that contains the code and data of the VMM 200X and the VM 300X. Accordingly, the virtualization barrier 280X may be referred to more specifically as a "limited virtualization barrier," while the virtualization barrier 280B may be referred to more specifically as a "complete virtualization barrier" or as a "bidirectional virtualization barrier." Another virtualization barrier would be established between the VM 300X and any other VM in the computer system 2X, although no such other virtualization barrier is illustrated in FIG. 3 because only one VM is illustrated. A virtualization barrier 280W between the VM 300X and the VMM 200X operates substantially the same as the virtualization barrier 280A shown in FIG. 2.

A Kernel-Based Virtual Computer System

In the computer system 2X of FIG. 3, the VMM is co-resident at system level with a host operating system. Both the VMM and the host OS can independently modify the state of the host processor, but the VMM calls into the host OS via a driver and a dedicated user-level application to have the host OS perform certain I/O operations on behalf of the VM. The virtual computer in this configuration is thus fully hosted in that it runs on an existing host hardware platform and together with an existing host OS.

Figure 4:
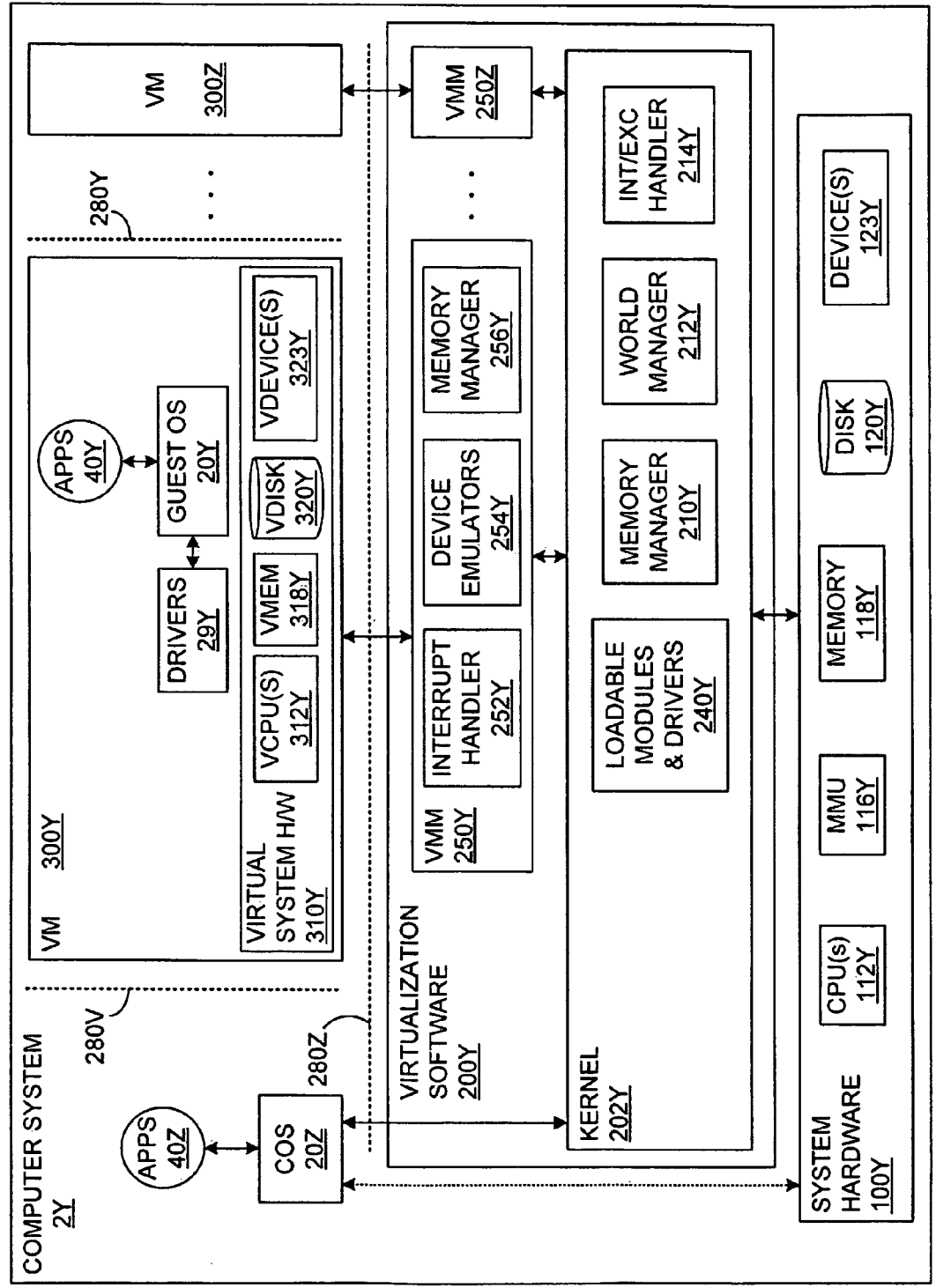
FIG. 4 illustrates an alternative configuration of a virtual computer system, which includes a kernel on which is run the VMM of FIG. 3.

In other implementations, a dedicated kernel, takes the place, and performs the conventional functions, of the host OS, and virtual computers run on the kernel. A "kernel-based" virtual computer system, in which a kernel serves as the system software for one or more VMM/VM pairs, is illustrated in FIG. 4. Compared with a system in which VMMs run on a host OS, use of a kernel offers greater modularity and facilitates provision of services that extend across multiple VMs (for example, for resource management). Compared with the hosted deployment described above, a kernel may offer greater performance because it can be co-developed with the VMM and be optimized for the characteristics of a workload consisting of VMMs. The ESX Server virtualization product of VMware, Inc., has such a configuration. A kernel-based virtualization system of the type illustrated in FIG. 4 is described in U.S. Pat. No. 6,961,941 to Nelson et al., "Computer Configuration for Resource Management in Systems Including a Virtual Machine", ("the '941 patent").

As shown in FIG. 4, the general configuration of a kernel-based virtual computer system 2Y, includes one or more virtual machines (VMs), such as a first VM 300Y and a second VM 300Z, each of which is installed as a "guest" on a "host" hardware platform 100Y. The hardware platform 100Y includes one or more processors (CPUs) 112Y, system memory 118Y, and one or more disks 120Y. The hardware 100Y may also include other conventional mechanisms such as a Memory Management Unit (MMU) 116Y and various devices 123Y.

The VM 300Y includes virtual system hardware 310Y, which typically includes at least one virtual CPU 312Y, at least one virtual disk 320Y, a virtual system memory 318Y, and various virtual devices 323Y. The VM 300Y also includes a guest operating system 20Y (which may simply be a copy of a conventional operating system) running on the virtual system hardware 310Y, along with a set of drivers 29Y for accessing the virtual devices 323Y and the virtual disk 320Y. One or more applications 40Y may execute in the VM 300Y on the guest OS 20Y and the virtual system hardware 310Y. All of the components of the VM may be implemented in software using known techniques to emulate the corresponding components of an actual computer. This implementation of the VM 300Y may generally be substantially the same as the implementation of the VM 300X shown in FIG. 3.

The VMs 300Y and 300Z are supported by a virtualization software 200Y comprising a kernel 202Y and a set of VMMs, including a first VMM 250Y and a second VMM 250Z. In this implementation, each VMM supports one VM. Thus, the VMM 250Y supports the VM 300Y and the VMM 250Z supports the VM 300Z. The VMM 250Y includes, among other components, device emulators 254Y, which may constitute the virtual devices 323Y that the VM 300Y accesses. The VMM 250Y may also include a memory manager 256Y. The VMM also usually tracks and either forwards (to some form of system software,) or itself schedules and handles, all requests by its VM for machine resources, as well as various faults and interrupts. A mechanism known in the art as an exception or interrupt handler 252Y may therefore be included in the VMM.

The computer system 2Y may, initially, have an existing operating system 20Z that may be at system level, and the kernel 202Y may not yet even be operational within the system. The initial system level interface between the OS 20Z and the system hardware 100Y is represented by a dashed line in FIG. 4. In such a case, one of the functions of the OS 20Z may be to make it possible to load the kernel 202Y, after which the kernel runs on the native hardware 100Y and manages system resources. In effect, the kernel, once loaded, displaces the OS 20Z. Thus, the kernel 202Y may be viewed either as displacing the OS 20Z from the system level and taking this place itself, or as residing at a "sub-system level." When interposed between the OS 20Z and the hardware 100Y, the kernel 202Y essentially turns the OS 20Z into an "application," which has access to system resources only when allowed by the kernel 202Y. The kernel then schedules the OS 20Z as if it were any other component that needs to use system resources. Accordingly, another interface is shown between the OS 20Z and the kernel 202Y for enabling the OS 20Z to access the system hardware 100Y. This second interface is shown with a solid line in FIG. 4.

The OS 20Z may also be included to allow applications unrelated to virtualization to run; for example, a system administrator may need such applications to monitor the hardware 100Y or to perform other administrative routines. The OS 20Z may thus be viewed as a "console" OS (COS). In such implementations, the kernel 202Y may also include a remote procedure call (RPC) mechanism to enable communication between, for example, the VMM 250Y and any applications 40Z installed to run on the COS 20Z.

As described in the '941 patent, the kernel 202Y handles the various VMM/VMs and the COS 20Z as entities that can be separately scheduled, which are referred to as "worlds." The worlds are controlled by a world manager, represented in FIG. 4 within the kernel 202Y as module 212Y. The kernel 202Y may also include an interrupt/exception handler 214Y that is able to intercept and handle interrupts and exceptions for all devices on the machine.

The kernel 202Y includes a system memory manager 210Y that manages all machine memory that is not allocated exclusively to the COS 20Z. When the kernel 202Y is loaded, the information about the maximum amount of memory available on the machine is available to the kernel, as well as information about how much of it is being used by the COS. Part of the machine memory is used for the kernel 202Y itself and the rest is used for the virtual machine worlds. Virtual machine worlds use machine memory for two purposes. First, memory is used to back portions of each world's memory region, that is, to store code, data, stacks, etc. For example, the code and data for the VMM 250Y is backed by machine memory allocated by the kernel 202Y. Second, memory is used for the guest memory of the virtual machine. The memory manager may include any algorithms for dynamically allocating or deallocating memory among the different VMs.

The kernel 202Y is responsible for providing access to all devices on the physical machine. In addition to other modules that the designer may choose to load onto the system for access by the kernel, the kernel will typically load conventional drivers as needed to control access to devices. Accordingly, a module 240Y containing loadable kernel modules and drivers is shown in FIG. 4. The kernel 202Y may interface with the loadable modules and drivers in a conventional manner, i.e., using an API or similar interface.

A first virtualization barrier 280V between the COS 20Z and the VMs 300Y and 300Z, a second virtualization barrier 280Y between the VMs 300Y and 300Z, and a third virtualization barrier 280Z between the virtualization software 200Y and the VMs 300Y and 300Z, as well as the COS 20Z, are represented in FIG. 4. There would also be additional virtualization barriers between any other VMs in the computer system. The virtualization barriers 280V and 280Y may be substantially the same as the virtualization barrier 280B of FIG. 2, while the virtualization barrier 280Z may be substantially the same as the virtualization barrier 280A.

Overview of Memory Mapping in Virtual Computer Systems

When memory addresses are generated in the VM 300X of FIG. 3, either by the applications 40X or the guest system software 19X, the addresses are generally mapped to corresponding addresses in the physical memory 118X. Both the guest OS 20X and the memory manager 256X are involved in this mapping process. Similarly, when memory addresses are generated in the VM 300Y of FIG. 4, either by the applications 40Y or the system software of the VM 300Y, the guest OS 20Y and the memory manager 256Y are involved in the process of mapping the addresses to corresponding addresses in the physical memory 118Y. These address mapping processes are substantially similar in both the hosted virtual computer system 2X of FIG. 3 and the kernel-based virtual computer system 2Y of FIG. 4. Thus, the following description is generally limited to the process of mapping addresses from the VM 300X of FIG. 3 to the physical memory 118X, although it generally also applies to the corresponding process of FIG. 4, and to corresponding processes in other virtual computer systems.

Most modern computers implement a "virtual memory" mechanism, as described briefly above, that allows user-level software to specify memory locations using a set of virtual addresses. These virtual addresses are then translated or mapped into a different set of physical addresses that are actually applied to physical memory to access the desired memory locations. The range of possible virtual addresses that may be used by user-level software constitutes a virtual address space, while the range of possible physical addresses that may be specified constitutes a physical address space. The virtual address space is typically divided into a number of virtual memory pages, each having a different virtual page number, while the physical address space is typically divided into a number of physical memory pages, each having a different physical page number. A memory "page" in either the virtual address space or the physical address space typically comprises a particular number of memory locations, for example, such as either a four kilobyte (KB) memory page or a two megabyte (MB) memory page in an x86 computer system.

The operation of a virtual memory system is well understood by those of ordinary skill in the art and will not be described in further detail herein. For more information, see "Computer Organization & Design: the Hardware/Software Interface," by David A. Patterson and John L. Hennessy, 2nd ed., Morgan Kaufmann Publishers Inc., San Francisco, Calif., 1998.

Classical Memory Virtualization

Conventional non-virtualized operating systems use page tables to map virtual addresses to physical addresses with page granularity. A virtual page number (VPN) is mapped to a physical page number (PPN), and VPN-to-PPN translations are cached by a hardware translation lookaside buffer (TLB.)

The classical virtual machine monitor (VMM) provides each virtual machine (VM) with the "illusion" of being a dedicated physical machine that is fully protected and isolated from other virtual machines. To support this illusion, physical memory is virtualized by adding an extra level of address translation. The terms "machine address" and "machine page number" (MPN) are herein used to refer to actual hardware memory. In contrast, "physical" memory is a software abstraction that presents the illusion of hardware memory to a VM. Address translation performed by a guest operating system in a VM maps a guest virtual page number (GVPN) to a guest physical page number (GPPN). The VMM maintains a pmap data structure for each VM to store GPPN-to-MPN translations. The VMM also typically manages separate shadow page tables, which contain GVPN-to-MPN mappings, and keeps them consistent with the GVPN-to-GPPN mappings managed by the guest OS. As the hardware TLB caches direct GVPN-to-MPN mappings, ordinary memory references execute without incurring virtualization overhead. It should be noted that the memory 118X (FIG. 3) and the memory 118Y (FIG. 4) can also be referred to as "machine" memory. Where necessary, "machine" is used when needed to avoid confusion between "guest physical" and "physical," as used in a virtual environment.

Figure 5:
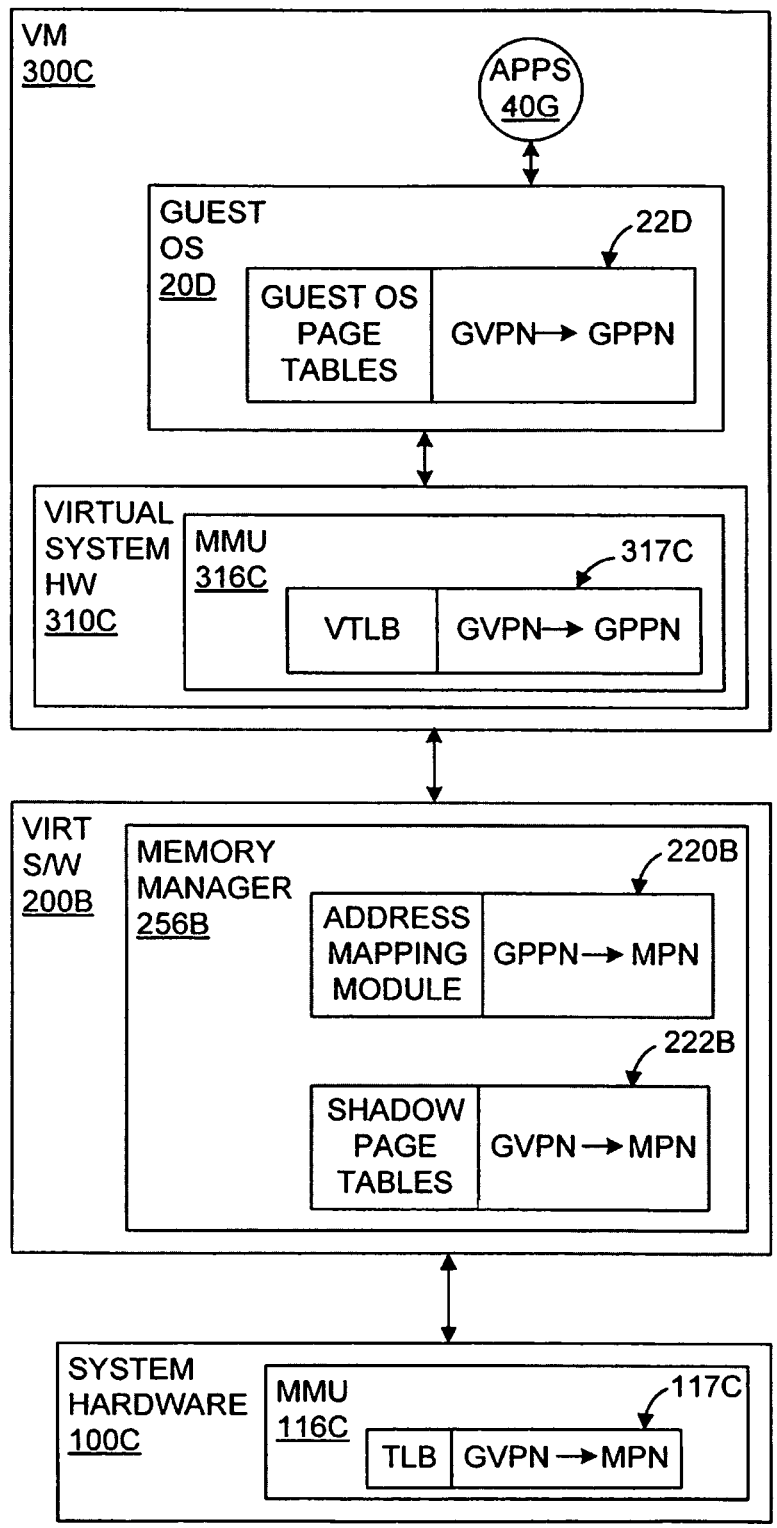
FIG. 5 is a representation of components used for known address mapping function.

Referring now to FIG. 5, some of the functional units involved in the address mapping process described above will be described. The virtual computer system shown in FIG. 5 is a more abstract depiction that can represent either of computer systems 2X, 2Y of FIGS. 3, 4, respectively. System hardware 100C includes an MMU 116C, which further includes a TLB 117C. It should be noted that elements with reference labels similar to those shown in FIGS. 3 and 4 have similar, if not the same, functionality.

Virtualization software 200B executes on the system hardware 100C, and may be substantially the same as the virtualization software 200X of FIG. 3 or the virtualization software 200Y of FIG. 4. The virtualization software 200B includes a memory manager 256B, part of the VMM (not shown), which further includes an address mapping module 220B and a set of shadow page tables 222B.

The virtualization software 200B supports a VM 300C that includes virtual system hardware 310C, which further includes an MMU 316C, which may further include a virtual TLB (VTLB) 317C, although the MMU 316C may also be implemented without a virtual TLB. The VM 300C also includes a guest OS 20D and a set of one or more applications 40G. The guest OS 20D includes a set of guest OS page tables 22D.

The guest OS 20D generates the guest OS page tables 22D that map the guest software virtual address space to what the guest OS perceives to be the machine address space. In other words, the guest OS 20D maps GVPNs to GPPNs. Suppose, for example, that a guest application 40G attempts to access a memory location having a first GVPN, and that the guest OS has specified in the guest OS page tables that the first GVPN is backed by what it believes to be a machine memory page having a first GPPN.

The address mapping module 220B keeps track of mappings between the GPPNs of the guest OS 20D and the "real" machine memory pages of the machine memory within the system hardware 100C. Thus, the address mapping module 220B maps GPPNs from the guest OS 20D to corresponding MPNs in the machine memory. Continuing the above example, the address mapping module translates the first GPPN into a corresponding first MPN.

The memory manager 256B creates a set of shadow page tables 222B that are used by the MMU 116C. The shadow page tables 222B include a number of shadow page table entries (PTEs) that generally correspond to the PTEs in the guest OS page tables 22D, but the shadow PTEs map guest software virtual addresses to corresponding machine addresses in the actual machine memory, instead of to the physical addresses specified by the guest OS 20D. In other words, while the guest OS page tables 22D provide mappings from GVPNs to GPPNs, the shadow PTEs in the shadow page tables 222B provide mappings from GVPNs to corresponding MPNs. Thus, continuing the above example, instead of containing a mapping from the first GVPN to the first GPPN, the shadow page tables 222B would contain a shadow PTE that maps the first GVPN to the first MPN. When the guest application attempts to access a memory location having the first GVPN, the MMU 116C loads the mapping from the first GVPN to the first MPN in the shadow page tables 222B into the physical TLB 117C, if the mapping is not already there. This mapping from the TLB 117C is then used to access the corresponding memory location in the machine memory page having the first MPN.

Embodiments of the present invention use cloaking to protect unmodified legacy applications running on unmodified commodity operating systems. Cloaking is a low-level primitive that operates on basic memory pages. Nearly all higher-level application resources, including code, data, files, and even Inter-Process Communication (IPC) streams, however, are already managed as memory-mapped objects by modern operating systems, or can be adapted as such. As a result, cloaking is sufficiently general to protect all of an application's major resources.

To implement cloaking some modifications to the normal execution environment are provided.

As will be described below in more detail, embodiments of the present invention introduce, at load time, a shim program into the address space of each cloaked application, mediating all communication with the OS. With assistance from the VMM, the shim interposes on events such as system calls and signal delivery, modifying their semantics to enable safe resource sharing between a cloaked application and an untrusted OS. In addition, the shim manages a mapping of guest virtual addresses to "physical resources," i.e., allocated memory that can be either file-backed or not.

Figure 6:
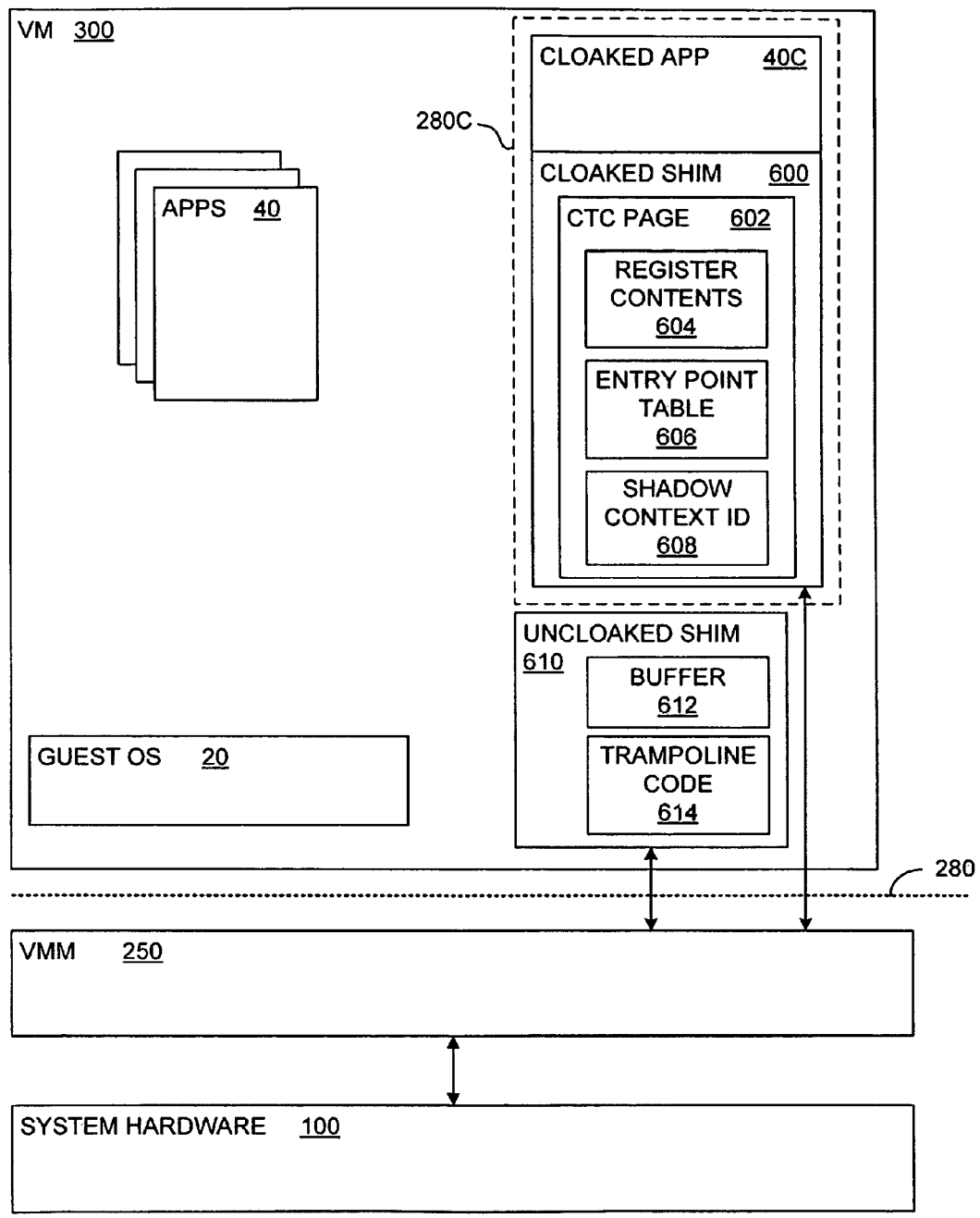
FIG. 6 is a block diagram of the architecture of one embodiment of the present invention.

An overview of the architecture of embodiments of the present invention is presented in FIG. 6. For ease of explanation, a single VM 300 is depicted, consisting of a guest OS 20 together with multiple applications 40, one of which is a cloaked application 40C. A VMM 250 effectuates a cloaking virtualization barrier 280C between the cloaked application 40C and the guest OS 20, similar to the barrier 280 the VMM 250 enforces between the guest OS 20 and host hardware 100. A cloaked shim program 600 is provided into the address space of the cloaked application 40C. The cloaked shim 600 cooperates with the VMM 250 to interpose on all control flow between the cloaked application 40C and the guest OS 20. Additionally, an uncloaked shim 610 is provided and includes buffer space 612 to provide a neutral area for the guest OS 20 and cloaked application 40C to exchange uncloaked data, as will be explained in more detail below.

Multi-Shadowing

As discussed above, existing virtualization systems present a single view of guest "physical" memory, generally faithfully emulating the properties of real hardware. One-to-one GPPN-to-MPN mappings are typically employed, backing each guest physical page with a distinct machine page. Some systems implement many-to-one mappings to support shared memory, e.g., transparent page sharing maps multiple GPPNs, using copy-on-write, to a single MPN. However, existing virtualization systems do not provide flexible support for mapping a single GPPN to multiple MPNs.

Figure 7:
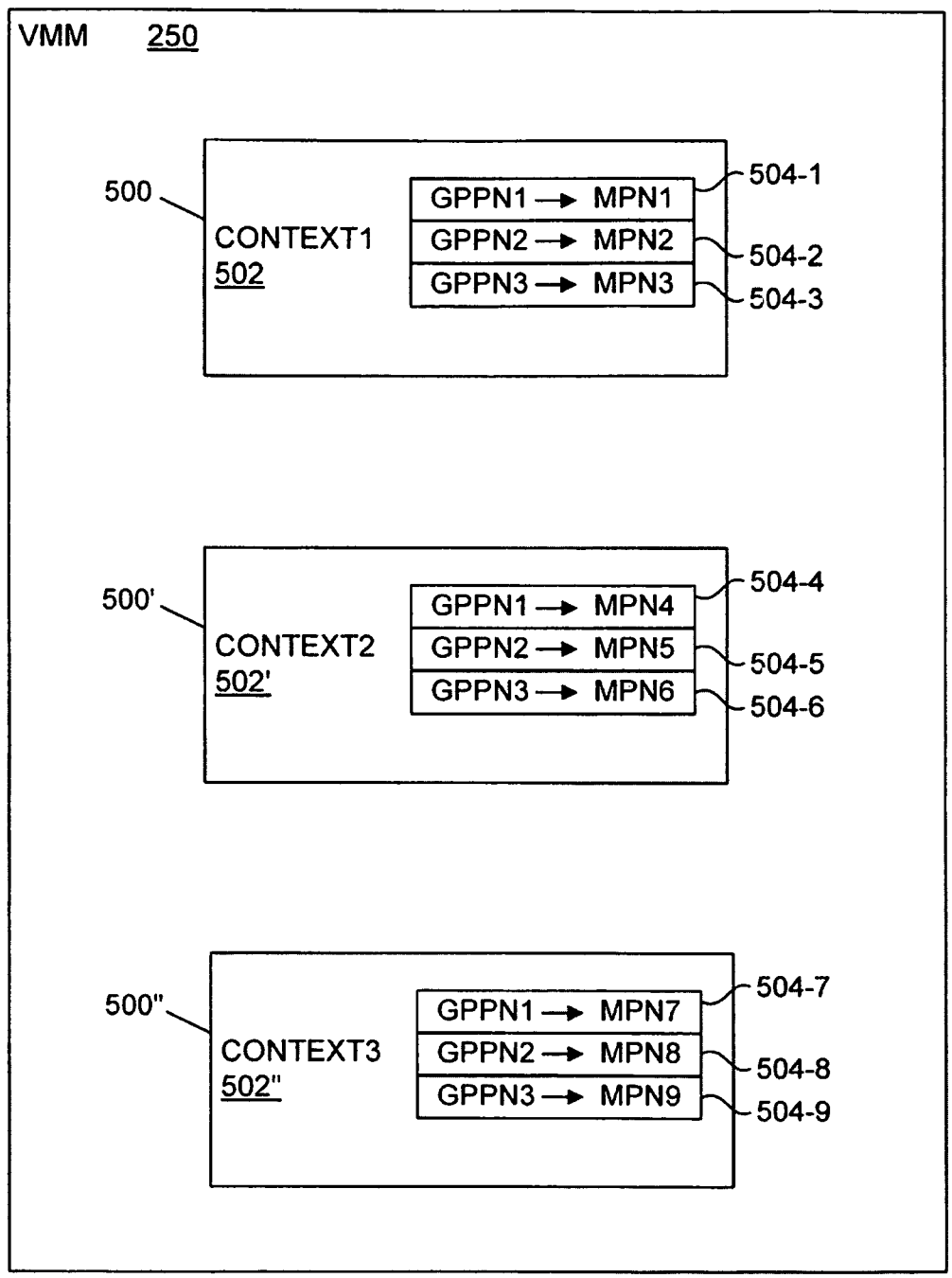
FIG. 7 is a representation of multiple physical address mapping modules in accordance with one embodiment of the present invention.

Multi-shadowing, in accordance with embodiments of the present invention, is a mechanism that supports context-dependent, one-to-many GPPN-to-MPN mappings. Conceptually, multiple shadow page tables are used to provide different views of guest physical memory to different shadow contexts. The "context" that determines which view (shadow page table) to use for a particular memory access can be defined in terms of any state accessible to the VMM, such as the current protection ring, page table, instruction pointer, contents of a register, contents of a memory location, or some other criteria. FIG. 7 shows multiple physical address mapping modules 500, 500', 500" that correspond with the multiple shadow page tables, with the address mapping modules providing GPPN-to-MPN mappings and the shadow page tables providing corresponding GVPN-to-MPN mappings. Thus, in FIG. 7, a multi-shadow address mapping module 500 would have multiple entries having a context portion 502 identifying CONTEXT1 and multiple mapping portions 504-1, 504-2, 504-3. In the example shown in FIG. 7, a first guest physical page (GPPN1) is mapped to a first machine page MPN1 for CONTEXT1 but is mapped to a different machine page MPN4 for CONTEXT2 as shown in multi-shadow address mapping module 500'. Similarly, in a first multi-shadow page table (not shown) for CONTEXT1, corresponding to the address mapping module 500, the GVPN that maps to GPPN1 would be mapped to MPN1, and, in a second multi-shadow page table (not shown) for CONTEXT2, corresponding to the address mapping module 500', the GVPN that maps to GPPN1 would be mapped to MPN4. In an x86 architecture, an MMU walks page tables in hardware, therefore multiple separate page tables—generally one for each context—are implemented.

Traditional operating systems and processor architectures implement hierarchical protection domains, such as protection rings. Multi-shadowing offers an additional dimension of protection orthogonal to existing hierarchies, enabling a wide range of unconventional protection policies.

As will be described in more detail below, embodiments of the present invention allow a guest OS to perform the tasks of application memory management, without allowing the guest OS to observe the actual memory contents.

Multi-shadowing ensures that the guest OS or other processes cannot view cloaked code and data in plaintext. To allow the guest kernel to easily manage the underlying memory resources, coordination is provided when, for instance, the kernel needs to swap out memory occupied by the cloaked data to disk, as well as for other operations related to cloaked memory and files. Advantageously, some embodiments of the present invention do not rely on the guest kernel using virtual DMA or other mechanisms that can be tracked by the VMM to perform swap and file I/O operations. If the kernel did not use DMA to implement these operations, without the advantages of some embodiments of the present invention, it would be difficult and expensive to track cloaked data using existing hardware and software techniques.

It has been recognized that encryption alone does not prevent the guest kernel from modifying cloaked page contents. Accordingly, some embodiments of the present invention include integrity verification, as described below. The kernel can corrupt application memory by modifying random bits of any cloaked memory page, and any such corrupted data may be detected before the application attempts to use it. Without integrity verification, an application could behave unexpectedly if using changed data, possibly leading to compromises that exploit such unexpected execution of the program to leak cloaked data.

Memory Cloaking

Cloaking combines multi-shadowing with encryption, presenting different views of memory—plaintext and encrypted—to different guest contexts.

Some embodiments of the present invention that implement virtualization-based cloaking do not require any changes to the processor architecture, OS, or applications. Cloaking based on multi-shadowing represents a relatively small change to the core MMU functionality already implemented by a VMM. As an overview, cloaking will be described using a high-level model. Metadata management and integration with existing systems are presented below.

Single Page, Encrypted/Unencrypted Views

In accordance with the teachings of some embodiments of the present invention, each GPPN uses only a single MPN, and dynamically encrypts and decrypts its contents depending on the context currently accessing the page. This works well because few pages are accessed simultaneously by both the application and the kernel in practice. As an alternate embodiment, two read-only copies of the page could be maintained, one encrypted, and one plaintext, for pages that are read concurrently from both contexts.

When a cloaked page is accessed from outside the shadow context to which it belongs, the VMM first encrypts the page, using a fresh, randomly-generated initialization vector (IV), then takes a secure hash (H) of this ciphertext. An initialization vector is commonly used in cryptography so that two chunks of data, e.g., two pages with the same contents, do not each encrypt to the same ciphertext. As an example, if two identical pages are encrypted, and an IV is not used—then each will encrypt to the same ciphertext, and an attacker will know that the two encrypted pages have the same contents. This information can be used to mount a "known plaintext" attack. Using a randomly-generated IV, the IV is appended to (or XOR'd with, or combined in some way with) the plaintext before it is encrypted. As identical pages will have different IVs, each will encrypt to a different ciphertext, assuming that the same encryption key is used.

The pair (IV, H) is stored securely for future use. During decryption, the correct hash is first verified. If verification fails, the application may be terminated. If it succeeds, the cloaked page is decrypted, and execution proceeds as normal. By checking the hash before decryption, any attempts to corrupt cloaked pages will be detected.

Figure 8A:
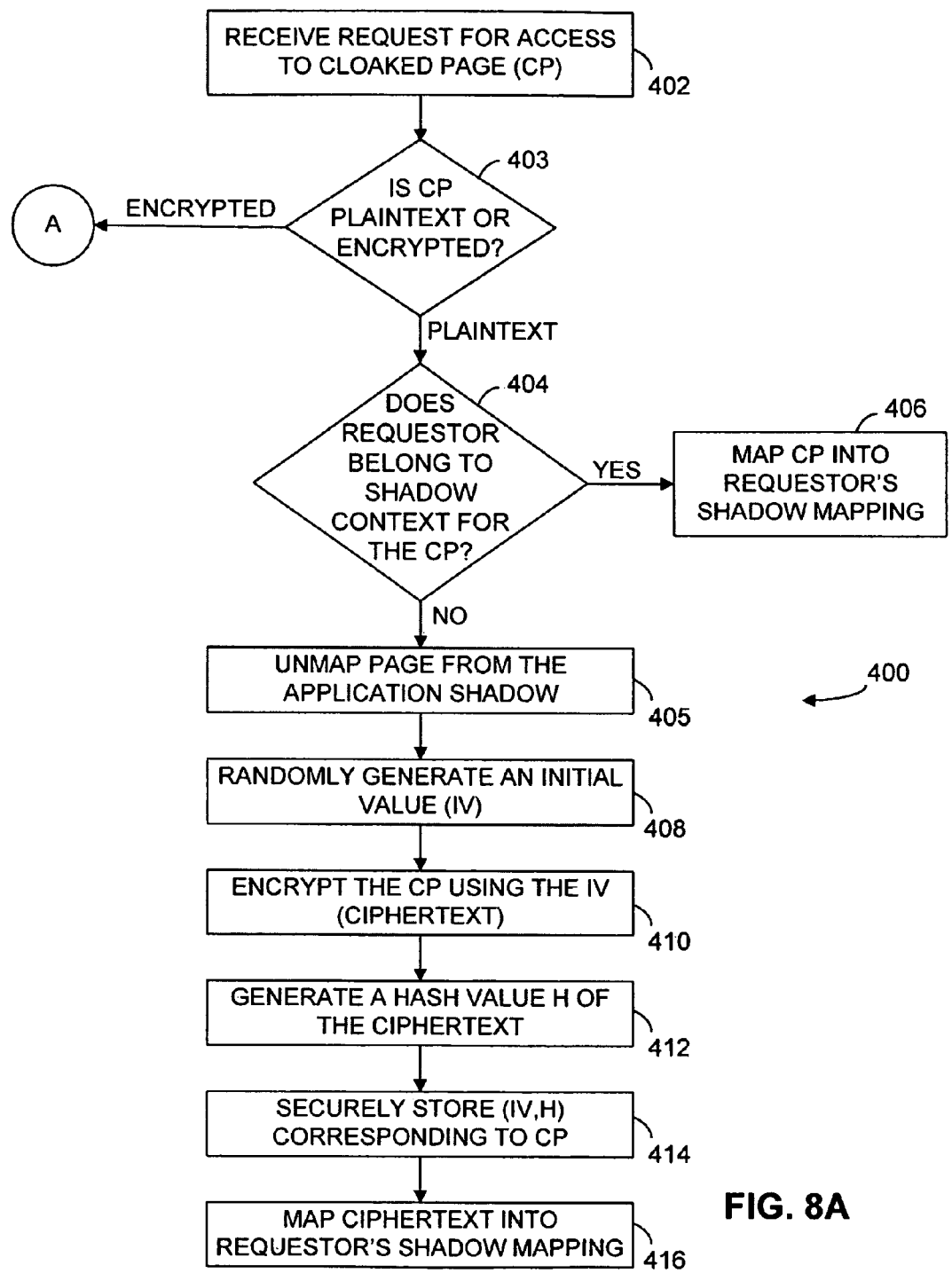
FIGS. 8A and 8B represent a flowchart of a process in accordance with one embodiment of the present invention.
Figure 8B:
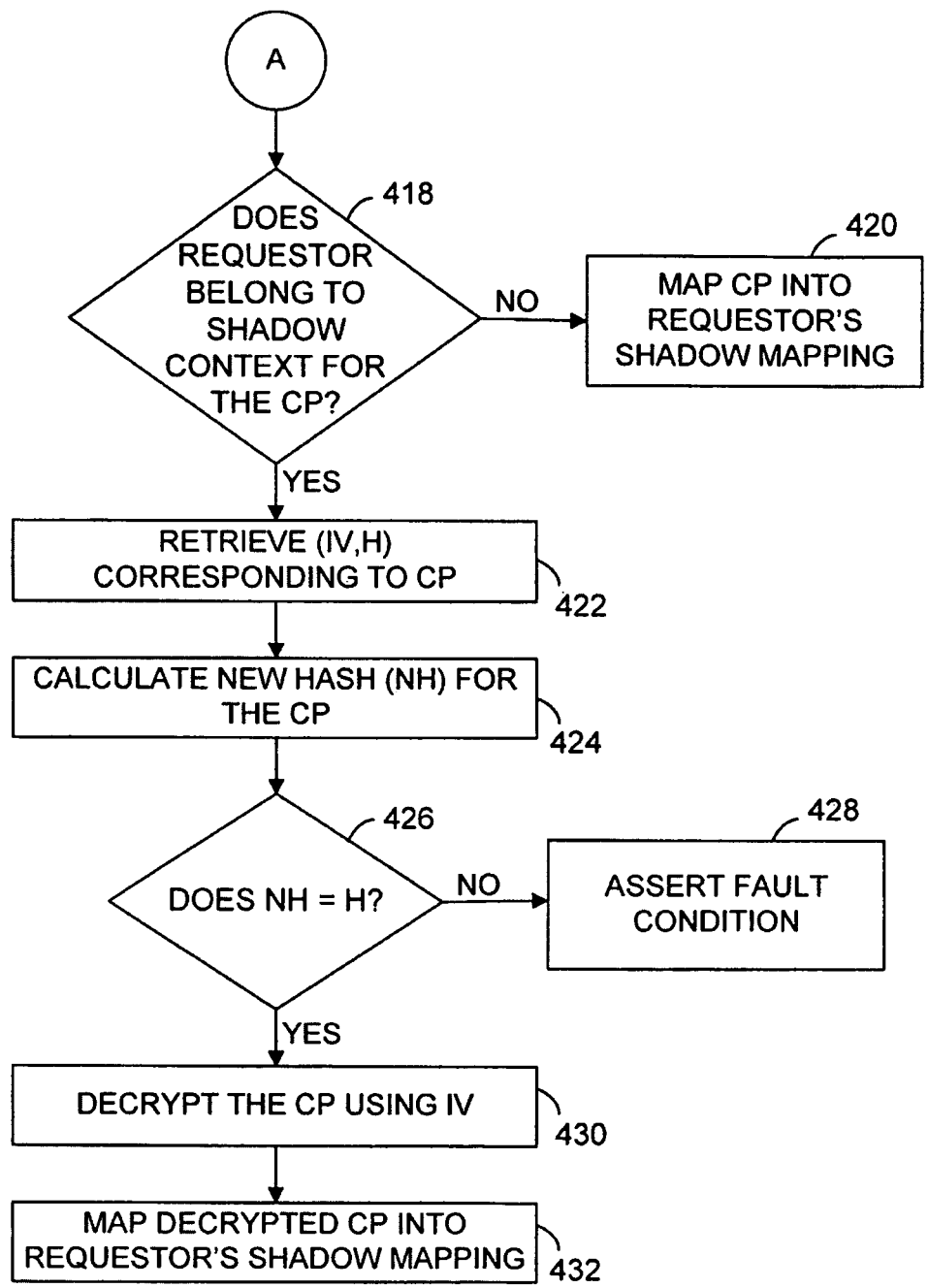

In general, referring now to FIGS. 8A and 8B, a method 400 in accordance with one embodiment of the present invention is presented. Initially, at step 402, a request for access to a cloaked page (CP) is received, e.g., through an attempted memory access. Subsequently, step 403, it is determined if the CP is plaintext or encrypted. If plaintext, control passes to step 404, where it is determined whether or not the requester belongs to the shadow context for the CP. If the requester does belong to the shadow context, control passes to step 406 where the CP is mapped into the requester's shadow mapping. If, on the other hand, the requester is not a member of the shadow context for the requested CP, control passes to step 405 where the page is unmapped from the application shadow. An initialization vector (IV) is randomly generated, step 408, and the CP is encrypted using the IV, step 410, to create a ciphertext. A hash value (H) is generated for this ciphertext, step 412. The (IV, H) pair is securely stored to correspond with the CP, step 414. In step 416, the ciphertext is mapped into the requester's shadow mapping.

Returning to step 403, if CP is encrypted, control passes to step 418 where it is determined whether or not the requester belongs to the shadow context for the CP. If the requester does not belong to the shadow context, control passes to step 420 where the CP is mapped into the requester's shadow mapping.

If the requester is a member of the shadow context for the requested CP, control passes to step 422 where the (IV,H) pair corresponding to the CP is retrieved. A new hash (NH) value is calculated for the CP, step 424, and compared to the hash H in the retrieved (IV,H) pair, step 426. If NH is not the same as H, control passes to step 428 where a fault condition is asserted. If NH is the same as H, then CP is decrypted using IV, step 430, and decrypted CP is mapped into the requestor's shadow mapping, step 432.

In one embodiment of the present invention a single secret key $K_{VMM}$ managed by the VMM is used to encrypt all pages, as will be described below in more detail. In one embodiment, the encryption uses AES-128 (Advanced Encryption Standard) in CBC (Cipher-Block Chaining) mode, and hashing uses SHA-256 (Secure Hash Algorithm); both are standard constructions. Of course, one of ordinary skill in the art will understand that a mode using multiple keys could be supported.

An alternate embodiment of the present invention implements an integrity-only mode of operation. In this embodiment, the concern is not about the privacy of the data, so the application data is in plaintext, i.e., not encrypted. As a result, the IV, which is used for encryption/decryption, as above, is not needed.

In "integrity only" mode, the focus is on only detecting tampering, and thus should need only the secure hash. As an alternative implementation to a secure hash H, other cryptographic authentication methods could be used, e.g., a message authentication code (MAC), as known to those of skill in the art. In any case, a secure hash H or MAC is used to protect the integrity of encrypted page contents; if a cloaked page is corrupted, its MAC will change, therefore allowing the modification to be detected.

Basic Cloaking Protocol

Consider a single guest "physical" page (GPPN). At any point in time, the page is mapped into only one shadow page table—either a protected application shadow used by a cloaked user-space process, or the system shadow used for all other accesses. When the page is mapped into the application shadow, its contents are ordinary plaintext, and application reads and writes proceed normally.

Figure 9:
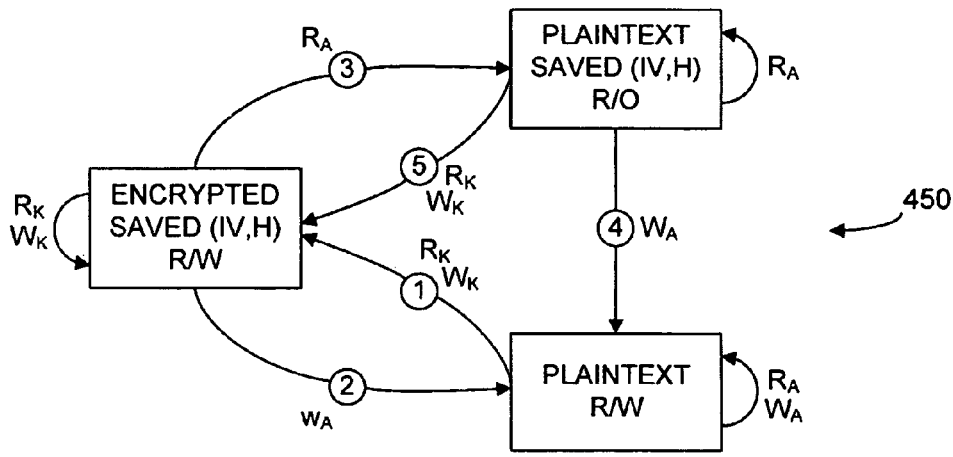
FIG. 9 is a state transition diagram for managing cloaked pages in accordance with one embodiment of the present invention.

FIG. 9 presents a state transition diagram 450 for managing, i.e., maintaining, the secrecy and integrity of a single cloaked page. Of course one of ordinary skill in the art would understand how to apply this to multiple cloaked pages. Application reads $R_A$ and writes $W_A$ manipulate plaintext page contents while kernel reads $R_K$ and writes $W_K$ use an encrypted version of the page. The secure hash H is computed and stored immediately after page encryption and verified immediately prior to page decryption.

When the cloaked page is accessed ($R_K$, $W_K$) via the system shadow transition 1, the VMM unmaps the page from the application shadow, encrypts the page, generates an integrity hash, and maps the page into the system shadow. The kernel may then read the encrypted contents, e.g., to swap the page to disk, and may also overwrite its contents, e.g., to swap in a previously-encrypted page.

When the encrypted page is subsequently accessed ($R_A$, $W_A$) via the application shadow transitions 2 or 3, the VMM unmaps the page from the system shadow, verifies its integrity hash, decrypts the page, and maps the page into the application shadow. For an application read $R_A$ transition 3, the page is mapped read-only and its (IV, H) pair is retained. If the page is later written $W_A$ by the application, transition 4, the (IV, H) pair is discarded, and the page becomes readable and writable. If the page is instead accessed ($R_K$, $W_K$) by the kernel, transition 5, the VMM proceeds as in transition 1, except that the hash H for the (unmodified) page is not recomputed. Returning to transition 2, for an application write $W_A$, the (IV, H) pair is discarded as in transition 4, and the page remains readable and writable.

The read-only plaintext state, where the (IV, H) pair is retained, is generally required to correctly handle the case where the kernel legitimately caches a copy of the encrypted page contents. For example, consider the case where the kernel swaps a cloaked page to disk, which is later paged in due to an application read, and then swapped out again before the application modifies it. The kernel can optimize the second page-out by noticing that the page is not dirty, and simply unmap the page without reading it because the on-disk swapped copy would still be valid. If the (IV, H) pair has been discarded, it would not be possible to decrypt the page after it is swapped back in.

Cloaking is compatible with copy-on-write (COW) sharing of identical pages, i.e., those with identical contents, such as described in U.S. Pat. No. 6,789,156 to Waldspurger, "Content-Based, Transparent Sharing of Memory Units" ("the '156 patent"). At the VMM level, a plaintext MPN can be shared transparently between VMs or within a single VM. Plaintext pages can be shared transparently, and page encryption is handled like a COW fault. When a cloaked GPPN transitions to an encrypted state, it is treated like a COW fault, and a private MPN is allocated to store the encrypted version of the GPPN.

Virtual DMA

Cloaking is also compatible with virtual devices that access guest memory using DMA. For example, suppose the guest kernel performs disk I/O on a cloaked memory page via a virtual SCSI adapter. For a disk read, the cloaked page contents are already encrypted on disk, and the VMM simply permits the kernel to issue a DMA request to read the page.

For a disk write, the action taken by the VMM depends on the current state of the cloaked page. If the page is already encrypted, the VMM allows the DMA to be performed directly. When the page is in the plaintext read-only state, the VMM first encrypts the page contents with its existing (IV, H) into a separate page that is used for the DMA operation. Similarly, if the page is in the plaintext read-write state, the VMM encrypts its contents into a separate page used for the DMA operation. The cloaked page then transitions to the read-only plaintext state, and is associated with the newly generated (IV, H). Note that in both plaintext states, the original guest page is still accessible in plaintext form to the application because a transient encrypted copy is used during the actual DMA.

Managing Protection Metadata

Embodiments of the present invention introduce OS-neutral abstractions for cloaking both persistent and non-persistent resources, such as files and private memory regions. In other words, memory mapped data, for both file-backed and "anonymous" memory regions, must be managed. For each resource, protection metadata, such as (IV, H) pairs, must be managed to enforce privacy and integrity, ordering, and freshness (to prevent rollback). This management is provided, in embodiments of the present invention, by several parts of the described system: the VMM manages the protection metadata in memory and uses it to encrypt/decrypt and check the integrity and ordering of protected data; the cloaked shim manages a mapping of "physical resources," i.e., allocated memory (either file-backed or not) virtual addresses within a given application address space, thus permitting a mapping between (IV, H/MAC) pairs and physical pages to be established for use by the VMM. An unprotected guest OS updates the cryptographic metadata for protected files as protected data and protection metadata are both stored in the guest OS. The unprotected guest OS is only involved in persisting metadata, e.g., storing protection metadata for on-disk file and an associated on-disk metadata file.

Figure 10:
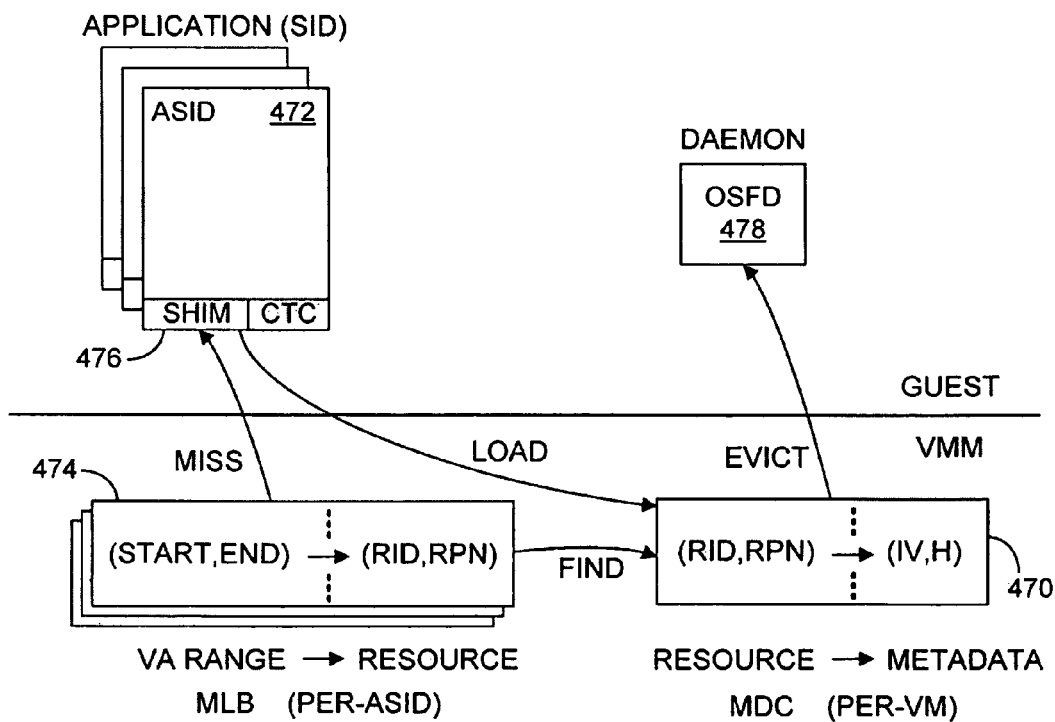
FIG. 10 is a representation of the components involved in metadata protection in accordance with an embodiment of the present invention.

An overview of the components involved in metadata protection is presented in FIG. 10. The description to follow begins by examining how metadata is stored, how protected objects are mapped to metadata, and then describes how the metadata is used to enforce protection.

Protected Resources

Each cloaked resource, such as a file or an anonymous memory region, is associated with a unique 64-bit resource identifier (RID) in one embodiment of the present invention. Each RID has a corresponding resource metadata (RMD) object that stores metadata needed to decrypt, check integrity, and preserve ordering. In one embodiment of the present invention, an RMD object is an ordered set of (IV, H) pairs, one per encrypted page, addressed by a 32-bit resource page number (RPN).

An RMD object is an abstraction that serves as a container for the protection metadata where each resource has a corresponding metadata object. An RMD object is a logically contiguous addressable object that may be created, truncated, extended or deallocated.

An RMD is applied to different types of resources: files; and anonymous memory regions. In one embodiment of a file-backed RMD, the RID may be a large integer that uniquely identifies the resource, for example, an integer corresponding to the <device_id, inode> of a file in the file system. In one embodiment, this is a 64-bit value consisting of 32 bits for the inode and 32 bits for the device_id. On a local filesystem, it is expected that this is sufficient to allow the RID to uniquely identify the file with which it is associated, even in light of renaming, etc.

As set forth above, for one embodiment, the RID for a file is constructed from its device and inode numbers. There is, however, no protection for file system metadata; consequently, a malicious OS could swap inputs on an application. In order to provide security for this file system metadata, a secure namespace can be provided associating pathnames with (RID, MAC) pairs. This could be implemented by employing a protected daemon or shared file, which would be updated on file operations such as rename, create, and unlink.

When a resource is mapped into memory, its RMD object is loaded into a metadata cache (MDC) 470 in the VMM. A single MDC 470 caches metadata for all cloaked resources mapped by the guest. This design ensures metadata consistency for shared objects, such as files and shared memory regions.

The MDC is composed of a collection of all RMDs in use by all address spaces in the system and the MDC can be seen as a collection of objects indexed by RID.

In one embodiment of the present invention, an entry has the form:

[RID−>(meta_data, dirty_bit, ref-count), RID−> ( . . . ), . . . ]

where the dirty_bit indicates if metadata has been modified, and must be written out upon eviction from the cache;

where ref-count indicates a number of applications using this resource (it is noted that each application should not indicate more than once that it is using a resource;) and where meta_data is a set of (IV, H/MAC) tuples.

In one embodiment of the present invention, an RMD object is implemented using a per-RID data structure, which may be referred to as a metadata translation table, and which supports a sparse resource address space. A three-level data structure similar to a page table is indexed by offset (in units of 4K pages).

It can be seen that this three-level data structure implementation supports a large amount of cloaked file contents. For example, if each <IV, H/MAC> tuple consumes 256 bits (32 bytes), then a single 4K leaf page can store 128 tuples. A single 4K directory page can store pointers (MPNs) for 1 K leaf pages. A top-level array of root pages is then used to index into the directory pages. Each root page can store pointers (MPNs) for 1 K directory pages, covering up to 128M tuples, enough for 512 GB of cloaked file contents.

Protected Address Spaces

In the x86 architecture, hardware faults and interrupts are generally delivered through an interrupt descriptor table (IDT). The OS kernel typically registers a routine for each fault/interrupt type, which is invoked in kernel-mode when the corresponding fault/interrupt occurs. Traditional hardware delivers hardware interrupts and faults to a kernel-mode handler. Typically, user-mode programs must specify handlers for resolving user-level exceptions through a "signal" delivery interface defined and mediated by the OS. Thus, in the x86 architecture, there is no mechanism to invoke a user-mode application handler from the existing hardware directly, without going through the OS (or guest OS) kernel.

In embodiments of the present invention, the VMM uses cached virtual-address mapping information for a cloaked user-mode process or application to resolve shadow page table page faults and perform corresponding encryption and decryption operations while running the application process in cloaked mode. This VMM-managed software cache is referred to as a "metadata lookaside buffer" (MLB), analogous to the hardware TLB in modern processors, and will be described below in more detail.

In embodiments of the present invention, the content of the cloaked virtual memory of a cloaked process is protected by the VMM using protection metadata and associated metadata translations. This data needs to be available to the VMM any time the VM is executing in cloaked mode. For example, when a cloaked process touches a page that was not mapped in the shadow page table, the VMM needs to determine whether the page is cloaked, and if it is cloaked, which protection metadata (e.g., IV and Hash/MAC) the VMM should use to decrypt and verify the integrity of the page. The VMM can access the metadata translation table and then look up the corresponding <IV, H/MAC> from the metadata cache, as described below.

The protection metadata cache in the VMM holds all metadata used by a running cloaked process, and is thus directly accessible by the VMM. However, the metadata translation table is not directly accessible by the VMM. Instead, the VMM caches a subset of the metadata translations in the Metadata Lookaside Buffer MLB. When new entries are inserted into the MLB table in the user-mode shim, the VMM need not be notified. Only when an entry is needed by the VMM, the VMM makes an "MLB upcall" through the user-level exception mechanism to invoke a handler in the shim.

When the VMM misses in the MLB, however, it needs to invoke a user-mode "MLB miss handler" in the cloaked process to resolve the miss. As above, with the constraints of the x86 architecture, existing hardware cannot invoke a user-mode handler without the OS kernel.

Embodiments of the present invention provide a control-transfer mechanism to perform an "upcall" from the VMM directly to a guest user-mode handler, without involving the guest OS kernel. As will be described in more detail below, when the VMM experiences an MLB miss, the VMM saves the faulting context and switches contexts to run the shim's MLB miss handler in guest user-mode. Upon completing the handler, the shim returns to the previously-faulted context and continues execution. As a result, such faults/upcalls are "invisible" to the OS kernel in that the data or information is never available to the guest OS in cleartext. All other architecturally-defined hardware faults or interrupts can be delivered to and processed by the guest kernel independently.

Access control and sharing for cloaked resources are determined by a unique security identifier (SID) that identifies a protection domain or execution context. In one implementation of the present invention, a SID is associated with an application instance, which may contain multiple processes. Processes with the same SID have common access to cloaked resources. The address space for a cloaked process is identified by a unique address space identifier (ASID) 472, as shown in FIG. 10, that defines its shadow context. Portions of multiple cloaked resources are typically mapped into the guest virtual address space associated with a given ASID.

The VMM maintains a per-ASID cache of resource mappings in its virtual address space, i.e., the metadata lookaside buffer MLB 474. The MLB 474 is used to map a virtual address to a resource. An MLB entry has the form (start, end)→(RID, RPN), where start and end denote the virtual address range into which the resource is mapped, RID denotes the resource being mapped, and RPN denotes the first RPN in the mapping. For example, if file "foo.txt" has RID 4, and its third page (starting from 0) is mapped into the first GVPN in the virtual address space, this would be modeled as (0,4096)→(4,2).

A shim program 476 is responsible for keeping a complete list of resource mappings for both cloaked and uncloaked memory and updating the MLB 474 whenever there is a change. The shim 476 resides in the same guest virtual address space, and interposes on all calls that modify it, such as mmap, munmap, and mremap in Linux. Advantageously, by implementing these functions in the user-mode shim 476, the VMM implementation is OS-neutral.

On an MLB miss, the VMM performs an upcall into the shim to obtain the required mapping, and installs it in the MLB 474, illustrated by the miss action in FIG. 10. The mappings for the shim 476 itself are pinned in the MLB 474, preventing recursion. Note that if the MLB has an incorrect mapping, it generally fails-closed. If the MLB 474 maps the wrong range of memory for a RID, or if the MLB 474 maps an uncloaked range as cloaked, then encryption or decryption will fail, or the application will end up accessing ciphertext, also causing it to fail. It is believed that failing closed is a better result than continuing operation on what might be faulty data.

In more detail, referring also to FIG. 6, the VMM first pushes the registers of the running cloaked process onto the top of an upcall register stack 604 in a cloaked thread context (CTC) 602 and then changes the guest VM's Instruction Pointer (IP), stack pointer (SP) and other general registers 606 with proper arguments to run the "MLB upcall". The "MLB upcall" handler installs the entry requested by the VMM through hypercalls and then issues a "return-from-upcall" hypercall to return to the VMM. The VMM then pops the registers from the upcall register stack 604 and resumes cloaked application execution. Note that recursive upcalls can be supported up to the memory limit of the "upcall register stack" in the CTC.

While the user-mode "MLB upcall" handler executes, it may still trap into the guest kernel through guest page faults, system calls and guest hardware interrupts. From the perspective of the guest kernel, it cannot observe that the upcall handler is being executed. In fact, the guest kernel cannot observe any code executed in cloaked mode. From the perspective of the application, it would not detect that the handler has been executed either. This is because the execution of the handler is atomic with respect to user-mode application code execution. This is achieved by delaying all signals delivered to the application thread from the guest kernel until the upcall returns and the application code is resumed. The MLB handler would not touch the memory (including shim's and app's) that would cause the same upcall to be delivered as it would result in an infinite number of upcall deliveries. In this context, the MLB handler would only touch those memory whose VPN–>RPN pairs are "pinned" in the VMM's MLB to avoid another upcall to the MLB handler.

In another illustrating example, the application makes a system call that requires argument marshalling by the shim. If some arguments of the system call are pointers to invalid addresses, the kernel typically returns an error code instead of delivering a signal SIGSEGV. To correctly produce the same behavior, the shim needs to touch the invalid guest virtual address to know whether the address is really valid. If the address is truly invalid, the OS would nevertheless deliver SIGSEGV. However, the shim would capture it and rollback any side effect caused by the shim's system call marshalling and deliver the correct syscall error code to the application.

The "VMM to guest user-mode" upcall mechanism can also be applied to use cases outside the scope of protection of cloaked application data as provided by embodiments of the present invention described herein. For example, traditionally a divide-by-zero exception caused by an application is delivered to the kernel. The kernel then delivers a signal to a user-mode handler in the application. With the above-described user-mode upcall mechanism, the CPU can directly invoke the user-mode handler for divide-by-zero. As another example, an application that attempts to dereference a NULL pointer typically results in a page fault generated by the hardware MMU and handled by the OS kernel, which in turn generally delivers a signal to a user-level handler in the application. In a virtualized system, the user-mode handler can be directly invoked, without guest OS involvement. User-mode programs could make use of this feature to implement new programming algorithms.

Other VMM-mediated upcall variants are also possible. For example, in another embodiment of the present invention another upcall mechanism is used to transfer control to the shim when a cloaked application makes a system call. The system call is intercepted by the VMM and execution control is transferred to a user-mode handler routine registered by the shim. As a result, the system calls made by the application may be transparent to the guest kernel. This control transfer is also completely transparent to the application, as the application does not need to know that the system call has been intercepted by the shim. This allows the application to run under protection of embodiments of the present invention without being modified or recompiled.

In embodiments of the present invention, the ability to redirect a trap to guest user-mode code allows for the redirection of system calls to handlers in the shim without dynamic VMM intervention.

Page Decryption

When a process accesses a cloaked page in its shadow context, its ASID and GVPN are known. If the page is unencrypted, then the memory access proceeds normally, without any VMM intervention.

If the page is encrypted, the access will fault into the VMM because the GVPN is not mapped into the shadow for that ASID. The VMM looks up the faulting address in the MLB 474, and uses the resulting (RID, RPN) pair to index into the MDC 470 and fetch the (IV, H) pair needed to decrypt and integrity check the page contents, as represented by the find operation in FIG. 10. The hash, check, and decrypt steps are performed using the protocol described previously. If the decryption succeeds, (RID, RPN) pair is invalidated in the MDC 470. The page is then "zapped," i.e., removed from all shadows, and mapped into the current shadow for the respective ASID. The original application access request is then allowed to proceed.

There is, however, one special case. Operating systems commonly zero the contents of a page before mapping it into userspace, and applications depend on this initialization. If an access is made to a GVPN that is not mapped in the current shadow, and the (RID, RPN) pair for that page is not in the MDC 470, then this is construed to be the first application access to the page, and no decryption is necessary. An embodiment of the present invention checks that the page contents are indeed zero-filled, and assuming this succeeds, the page is simply zapped and then mapped into the current shadow, and the original memory access is allowed to proceed.

Finally, the VMM stores the (RID, RPN) pair used for each decryption with the associated GPPN in the existing VMM pmap structure which stores GPPN-to-MPN translations.

Page Encryption

When the guest kernel (or any context that does not match the application SID) accesses a cloaked page, its GPPN is known, but its ASID and GVPN may not be known. The access could originate from any guest context, e.g., during a virtual DMA operation. If the page is already encrypted, then the memory access proceeds normally, without any VMM intervention.

If the page is unencrypted, the access will fault into the VMM because it is not mapped in the current shadow. If the page is writable, the VMM generates a new random IV; for a read-only page, the existing IV is re-used. The VMM then encrypts the page contents, and computes a secure hash H over the encrypted contents. It stores the resulting (IV, H) pair in the MDC 470, at the (RID, RPN) pair previously associated with the GPPN in the pmap during its last decryption. The page is then zapped and mapped into the current shadow, and the original kernel access is allowed to proceed.

Cloning Metadata

The MDC 470 also provides operations to facilitate support for address space cloning, such as clone or fork operations in Linux. As an example for explanatory purposes only, assume a cloaked process forks a child. Immediately after the fork, the parent and child processes share their private memory regions copy-on-write (COW). In operation, the metadata associated with all unmodified COW pages remains accessible and synchronized between the parent and child.

When the fork occurs, each of the parent's private RMD objects is cloned eagerly for the child, by copying all of its existing metadata entries, and assigning it a new RID. This ensures that metadata for any pages encrypted prior to the fork remain available to the child, even if the parent later modifies them.

In an exemplary situation, meant to aid in explanation but not limit any claims appended hereto, suppose the parent causes an encryption of a COW-shared page after the fork. A subsequent access by the child would not find the metadata required for decryption. One approach is to forcibly encrypt all pages in the parent during the fork, but this could be inefficient because few private pages remain encrypted in practice, unless the system is swapping heavily. Another option is to store a complete backmap for every GPPN, containing all (ASID, GVPN) pairs that map it, but this would be complex and resource-intensive.

The solution implemented by one embodiment of the present invention is to mirror the application's process tree in the MDC 470; each RMD object has pointers to its parent, first child, and next sibling RMD objects, if any. The MDC 470 also maintains a global 64-bit version number that is incremented on every RMD creation and page decryption. A version is stored with each RMD object and set to the global version when it is created. Similarly, a version is stored along with the (RID, RPN) pair in the pmap for each GPPN and set to the global version each time it is decrypted. When a page is encrypted, the (IV, H) pair is stored at the (RID, RPN) pair associated with the GPPN, and also recursively propagated to any child RMD objects with versions greater than the GPPN's version. Thus, metadata is propagated to all children with pages whose contents existed prior to the fork, as desired. It should be noted that when the parent modifies a COW page, it will be encrypted (and its metadata propagated to the child) prior to the modification because the guest OS must first read the page to make a private copy for the parent during the COW fault.

Persisting Metadata

Resources are either persistent or non-persistent. When a resource is not in use by any process, its respective RMD object is removed from the cache. RMD objects associated with non-persistent memory regions, e.g., application stack, data, or anonymous shared memory, can be discarded when no longer in use. However, RMD objects associated with persistent content, such as file-backed memory regions, must generally be saved to disk. In some embodiments, persistent RMD objects are stored as metadata files in the guest. Metadata file integrity is protected by a message authentication code (MAC), computed using a key derived from the VMM's secret key $K_{VMM}$ and stored in the file. One implementation uses HMAC (Hash Message Authentication Code) with SHA-256.

When a process opens a cloaked file, if there is no existing entry in the MDC 470 for that file's RID, the shim loads the RMD object from its associated metadata file, as illustrated by the load action in FIG. 10. Frequently reloading the RMD object or recomputing its MAC might raise efficiency concerns. The efficiency, however, can be optimized by keeping RMD objects cached longer in the MDC 470, instead of evicting them eagerly after they have been committed to disk. Another option would be to store MACs in a Merkle hash tree, allowing for more efficient verification and updates.

As set forth above, each allocated resource has an associated RID that the shim uses to refer to the object. The shim attempts to maintain a one-to-one correspondence between the metadata address space of the resource, by RID/offset, and the in-memory data in an application address space to be able to offer the appropriate virtual to resource address translations for use by the VMM. Advantageously, the shim does not need to track (IV, H/MAC) pairs as it manages a per-application mapping of VPN to RPN.

To ensure freshness, a 128-bit generation number is also written to the metadata file, and protected by the MAC. The VMM checks this number against a master list of valid generations when the file is loaded. This number is stored in the MDC 470 as part of the RMD object. Just prior to eviction, it is incremented in both the RMD and master list. The master list is stored in the guest, protected by a MAC and its own counter which is stored outside of the guest by the VMM.

RMD objects are written to metadata files by a file daemon 478. The daemon 478 communicates with the VMM via a hypercall interface, polling for metadata that should be evicted from the MDC 470 and persisted to disk. The daemon extracts the metadata for all of its valid RPNs, obtains their respective MAC as generated by the VMM, commits everything to disk, and finally evicts the RID from the MDC 470; refer to the evict action in FIG. 10. It should be noted that the daemon 478 is not trusted and all data it handles is protected cryptographically. Advantageously, if the daemon 478 were compromised, only system availability would be lost but data privacy and integrity would be maintained.

As above, a main task of the daemon is to provide access to the guest file system by the VMM. Thus, the VMM may update the contents of the protection metadata files. The daemon may periodically poll the VMM to determine if there are any updates that are needed and, if so, the daemon will read a complete metadata file from the VMM and then write the data to the file associated with that RID. In one embodiment of the present invention, the metadata files are updated when metadata has been modified and that file is no longer being used or by virtue of periodic writebacks implemented to improve system consistency.

Key Management and Access Control

In accordance with the architecture of embodiments of the present invention, a range of access control policies is supported, as SIDs provide a basic primitive for identifying subjects, and RIDs provide a basic primitive for identifying objects. One implementation may start with a model that assumes mutual trust between all parts of an application and dynamically assigns SIDs at startup.

In one implementation, all encryption is performed using a single set of encryption and MAC keys. It should be noted that key management and access control in embodiments of the present invention are orthogonal. The VMM arbitrates who is allowed to access what resources, regardless of the key with which it was encrypted. Additional keys could be added to support delegation of administrative tasks, e.g., one key per RID would allow different parties to package its own sets of encrypted files outside of the VM.

As referenced above, embodiments of the present invention provide several abstractions. First, a way of naming objects, by assigning each cloaked object a unique resource identifier (RID) is provided. Next, a model of where a given protected object is in memory, using a collection of objects referred to as a virtual memory area (VMA) is kept. Finally, a record of what cryptographic metadata is associated with a given object, e.g., the hash H, and IV previously discussed, is kept in an object referred to as a resource metadata (RMD) object.

Embodiments of the present invention keep an identifier for each protection domain known as a security identifier (SID) and each shadow context, i.e., address space, has a corresponding ASID.

OS Integration with Cloaking

The VMM interposes on transitions between the cloaked user-mode application and the guest kernel, using distinct shadow page tables for each. Privilege-mode transitions include asynchronous interrupts, faults, and signals, and system calls issued by the cloaked application. Mediating these interactions in a secure, backwards-compatible manner requires adapting the protocols used to interact with the operating system, as well as some system calls. As above, this is facilitated by the shim program that is loaded into a cloaked application's address space on startup.

In the description to follow, the shim is described in the context of a Linux implementation. This approach could be applied to other operating systems, e.g., Microsoft Windows, by one of ordinary skill in the art with an understanding of the description herein. While the system call interface varies across kernels, low-level mechanisms for system call vectoring, fault handling, and memory sharing, are tied more closely to the processor architecture than to a particular OS.

Initially, the basic operation of the shim, how it coordinates with the VMM to manage identity, and its interaction with the kernel and VMM to adapt the application for cloaked execution, will be described. Support for handling faults, interrupts, and system calls is presented in detail below.

Shim Overview

The shim is responsible for managing transitions between the cloaked application and the operating system. It uses an explicit hypercall interface for interacting with the VMM, i.e., a secure communication mechanism between the guest and the VMM. This arrangement allows relatively complex operations, such as OS-specific system call proxying, to be located in user-mode shim code, instead of the VMM. It also facilitates extensibility, providing a convenient place to add custom functionality without modifying the VMM.

Shim Memory

In memory, referring back to FIG. 6, each of the uncloaked shim 610 and the cloaked shim 600 consists of its own distinct code, data and stack space. Each application thread has its own shim instance, and all thread-specific data used by the shim is kept in thread-local storage, preventing conflicts between different instances.

The cloaked shim 600 is multi-shadowed like the rest of the applications. It is responsible for tasks where trust is required to maintain protection, such as providing well-defined entry and exit points for control transfers, and securely moving data between cloaked and uncloaked memory. As shown in FIG. 6, the cloaked shim 600 also includes the cloaked thread context CTC page 602, which is set aside for the VMM 250 to store sensitive data used for control transfers. The CTC page 602 includes areas for saving register contents 604, the table of entry points 606 to shim functions, and a shadow context identity 608 for the shadow context containing the shim 600.

The uncloaked shim 610, as represented in FIG. 6, contains buffer space 612 that provides a neutral area for the kernel and application to exchange uncloaked data. Trampoline code 614 facilitates transitions from the guest OS to cloaked code. Nothing in the uncloaked shim 610 is trusted or necessary for protection. As a worst case result, the application will crash if either the uncloaked shim code or data becomes corrupted and will have to be restarted.

Hypercall Interface

The VMM exports a small hypercall interface to the cloaked shim. Uncloaked code is allowed to invoke operations to initialize a new cloaked context (used to bootstrap). It can also make calls to enter and resume cloaked execution. As control can be transferred only to a cloaked context, these calls can be initiated safely by untrusted code. Cloaked code can make hypercalls to cloak new memory regions, unseal existing cloaked data, and access other useful interfaces, such as metadata cache operations.

Loading Cloaked Applications

To start a cloaked application, a minimal loader program is run with the shim linked into a distinct portion of its address space. The actual loader is part of the shim; before taking steps to load the program, the shim must bootstrap into a cloaked context.

To create a new shadow context, the shim issues a hypercall with a pointer to itself and protection metadata containing hashes for all pages associated with cloaked code and data as described above. The VMM uses this metadata to verify its integrity, as the cloaked shim will have access to the address space of the cloaked application. Thus, to bootstrap a secure protection domain for the application, the shim must be trusted, i.e., not malicious to the application. The call to create a new context also takes a pointer to a portion of thread-local storage in which the VMM can setup a new CTC. Once this setup is complete, the VMM transfers control to start execution in the cloaked shim.

The cloaked shim then runs its loading routine, which reads an executable and loadable format (ELF) binary, and maps appropriate sections into memory. When creating anonymous memory regions or memory-mapping protected files, the shim performs hypercalls to cloak their corresponding virtual memory ranges. On a subsequent execve, if the target program is cloaked, the loader program is prepended to the exec call so that the new program will also be cloaked.

Identity Management

The VMM needs a reliable procedure for identifying each cloaked process uniquely and precisely in order to locate the resources associated with the process inside the VMM. Such identification is difficult without the assistance or knowledge of the guest OS, even though the VMM can observe all instructions executed and the contents of all guest registers and memory.

To switch between shadow page tables, the VMM employs a procedure for identifying shadow contexts uniquely. Correct identification requires accounting for the fact that contexts are associated with guest-level process abstractions, and scheduling is controlled by the OS, not the VMM. For example, the guest kernel may switch contexts while handling a fault or system call.

Known approaches for VMM tracking of guest-level processes, such as monitoring assignments to the current page table root work fairly well, but are not foolproof. Other approaches, such as accessing a guest OS state at fixed kernel addresses, e.g., the Linux current pointer, is a fragile approach, however, as it assumes knowledge of kernel internals and address space layout, which may differ between OS releases. The VMM could store identifying information, e.g., a context identifier, at some user-level fixed virtual address. Unfortunately, this approach is fragile in a situation where the virtual page containing the identifier is not pinned in physical memory as the guest kernel may page it out, and the VMM cannot then page it back in without guest kernel cooperation. Address space layout conflicts and potential aliasing between identifier values and data in uncloaked applications present additional problems. Still further, these approaches cannot be guaranteed to work in the presence of an adversarial OS.

Embodiments of the present invention use a shim-based technique for managing identity that does not depend on information about kernel internals, and does not require the use of pinned memory. As the shim resides within the application virtual address space, its memory is managed normally by the kernel, and is reclaimed automatically when the application terminates.

The VMM detects when the execution control transfers from the cloaked process to the guest kernel, and the VMM saves the original instruction pointer IP and other registers in the context structure. Then the VMM changes the IP and registers so that the cloaked process resumes execution from a "self identifying" hypercall. The hypercall then identifies the cloaked process to the VMM and the VMM restores the original IP and other registers.

The VMM maintains a separate shadow context for each application address space, for which it assigns a unique ASID. Each address space may contain multiple threads, each with its own distinct CTC. When the shim begins execution, it makes a hypercall to initialize its CTC. During this initialization, the VMM writes the ASID and a random value into the CTC, and returns the ASID to the caller. The ASID value is not protected, and can be used by the uncloaked shim. However, since the CTC is cloaked, the random value is protected, and cannot be read by the uncloaked shim.

Shim hypercalls that transition from uncloaked to cloaked execution are self-identifying. The uncloaked shim passes arguments to the VMM containing its ASID, and the address of its CTC. The hypercall handler verifies that the CTC contains the expected random value, and also that its ASID matches the specified value. Note that the CTC resides in ordinary, unpinned application virtual memory. If the hypercall handler finds that the GVPN for the CTC is not currently mapped, it returns a failure code to the uncloaked shim, which simply touches the page to fault it back into physical memory, and then retries the hypercall.

Faults and Interrupts

Figure 11:
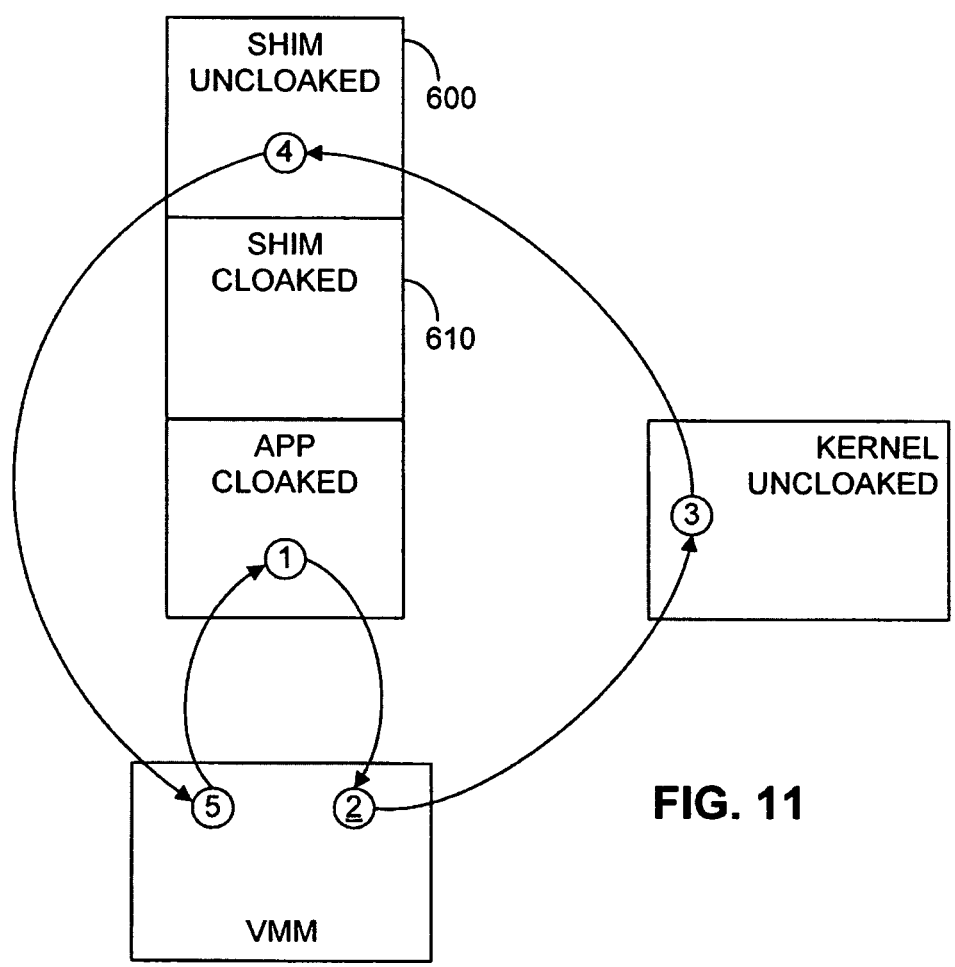
FIG. 11 is a representation of the control flow for handling faults and interrupts in accordance with an embodiment of the present invention.

While a cloaked application is executing, OS intervention is required to service faults or interrupts, such as application page faults and virtual timer interrupts. FIG. 11 illustrates the flow of control for handling a fault from a cloaked application, involving the application, its associated shim, the guest kernel, and the VMM. The procedure for handling a virtual interrupt is essentially identical.

For purposes of explanation, the fault occurs in step 1, and control is transferred to the VMM. In step 2, the VMM saves the contents of all application registers to the CTC in the cloaked shim. The VMM then zeros out the application's general-purpose registers to prevent their contents from being leaked to the OS. Next, the return instruction pointer IP and stack pointer SP registers are modified to point to addresses in the uncloaked shim, setting up a simple trampoline handler to which the kernel will return after servicing the fault. Finally, the VMM transfers control to the kernel.

The kernel handles the fault as usual in step 3, and then returns to the trampoline handler in the uncloaked shim set up in step 2. In step 4, this trampoline handler performs a self-identifying hypercall into the VMM to resume cloaked execution. In step 5, the VMM restores the registers saved in step 2, and returns control to the faulting instruction in the cloaked application.

Note that the active shadow page table is switched when transitioning between uncloaked and cloaked contexts. Two shadow page table switches are used to handle a fault in each of steps 2 and 5. The first switch, from the application shadow to the kernel shadow, occurs when the VMM transitions to the kernel in step 2. The second switch, from the kernel shadow to the application shadow, is performed when the VMM transitions back to the cloaked application in step 5.

System Call Redirection

The VMM does not manage the shim when it is running in the uncloaked mode as the shim does not need to access the resources maintained by the VMM. The VMM treats the shim in the same manner as any other process. In embodiments of the present invention, the CTC prevents the guest kernel from misrepresenting identity. When a process identifies itself, the VMM verifies the identity by comparing the value located in the CTC against the value saved or stored in the VMM for the corresponding process. Once verified, the cloaked application is able to access existing pages mapped by the shadow page table that correspond to the process. In other applications, if the guest kernel is trusted, the CTC is not needed. The identification mechanism, however, can still be used to identify execution in the process.

Figure 12:
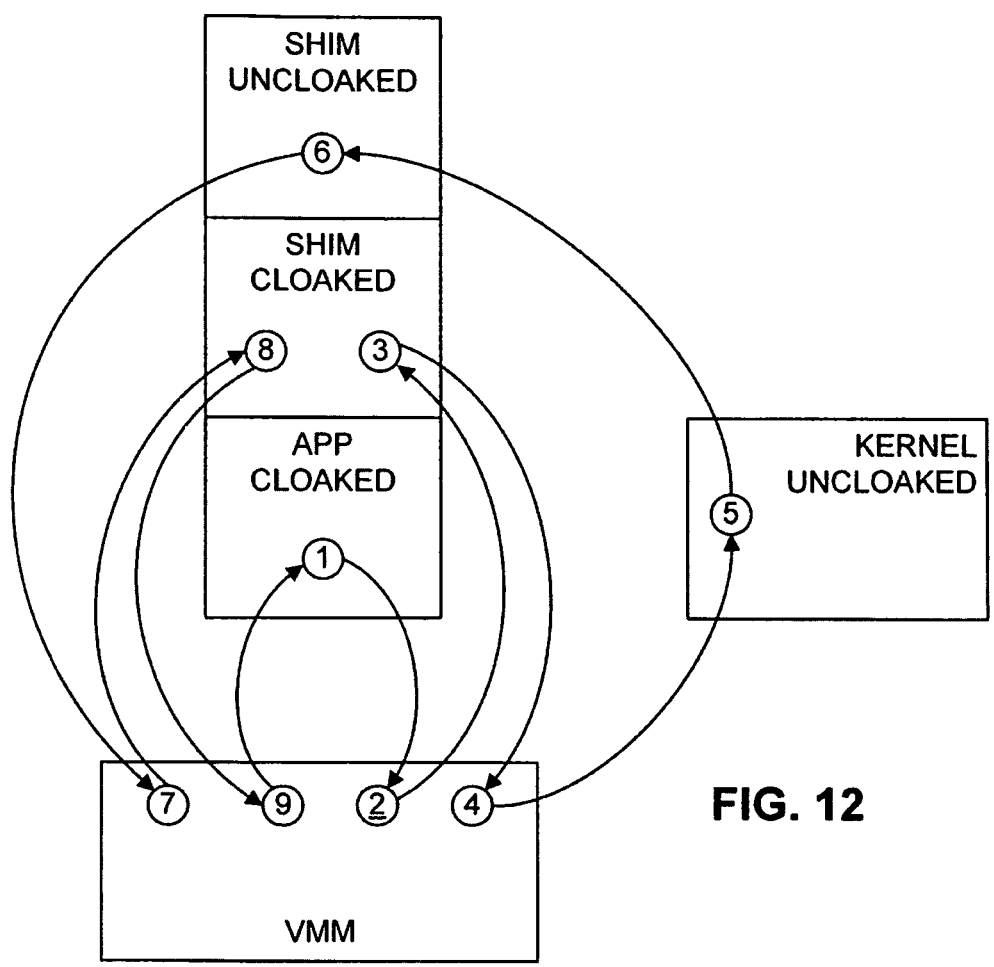
FIG. 12 is a state transition diagram for the control flow for handling system calls in accordance with an embodiment of the present invention.

Unlike faults and interrupts, which are intended to be transparent to the application, system calls represent an explicit interaction between the cloaked application and the kernel. A system call is issued by the application using the standard OS calling convention. FIG. 12 depicts the flow of control for handling a system call from a cloaked application, involving the application, its associated shim, the guest kernel, and the VMM. The transitions involved in performing a system call are a superset of the transitions presented for handling a fault as presented in FIG. 11.

The cloaked application performs a system call, step 1, and control is transferred to the VMM. The VMM saves, step 2, the contents of all application registers to the CTC in the cloaked shim. The IP is set to an entry point in the cloaked shim corresponding to a system call dispatch handler; similarly, the SP is set to a private stack in the cloaked shim for executing this handler. The VMM then redirects control to the dispatch handler in the cloaked shim. The cloaked dispatch handler performs, step 3, any operations required to proxy the system call on behalf of the application. For some system calls, this may involve marshalling arguments, copying them to a buffer in the uncloaked shim. The dispatch handler then reissues the system call, substituting the marshalled arguments in place of the original application-specified values. As before, the VMM again intercepts the system call.

Continuing, the VMM saves, step 4, the contents of all application registers in the CTC. Note that the CTC contains two distinct register save areas: one for the application registers saved previously in step 2, and one for the shim registers saved in this step. The VMM then scrubs the contents of any application registers that are not required by the kernel system call interface. The return IP and SP are modified to point to addresses in the uncloaked shim, setting up a simple trampoline handler to which the kernel will return after executing the system call. Finally, the VMM transfers control to the kernel.

The kernel executes the system call as usual in step 5, and then returns to the trampoline handler in the uncloaked shim set up in step 4. The trampoline handler performs, step 6, a self-identifying hypercall into the VMM to enter cloaked execution. In step 7, the VMM restores the shim registers saved in step 4, and resumes execution in the cloaked dispatch handler.

The cloaked dispatch handler continues execution, step 8, performing any operations required to finish proxying the system call. For some calls, this may involve unmarshalling result values, and copying them into cloaked application memory. The dispatch handler then performs a hypercall into the VMM, requesting resumption of the cloaked application. The VMM restores, step 9, the application registers saved in step 2, and returns control to the instruction after the original system call in the application.

As in the case of fault handling, only two transitions require shadow page table switches between uncloaked and cloaked contexts, i.e., during steps 4 and 7.

VMM Access of Guest Virtual Memory

The VMM can generally access the guest's physical memory without involving either the guest OS or applications. If the VMM needs to access the virtual memory of a user-level process and this virtual memory is not mapped into the physical address space, however, the VMM will not be able to access it. In one embodiment of the present invention, this issue is addressed by providing the hypercall interface with the ability to force the guest OS to page in required virtual memory pages and atomically transition into a mode such that subsequent accesses from the VMM will succeed.

In an example for purposes of explanation, consider the situation where the hypercall protocol for the user-level code in a VM receives an error indicating that a particular page is not currently mapped in the virtual address of the application. Upon receiving the error, the application may access the virtual address to force it to be paged in by the guest OS and then it can retry the hypercall. Multiple retries of the hypercall are possible if multiple virtual pages are needed to be paged in and the VMM will only process the hypercall if all pages are mapped in the page table. In embodiments of the present invention, the hypercall protocol is only visible to the shim library code, and thus is transparent to the application.

The traditional system call interface between an application and an OS kernel accepts virtual addresses from the application as arguments, and pages in the application memory if it is not currently backed by machine memory. It would only return an error if the virtual address passed in from the application is not valid.

In a VMM, the VMM can access a guest virtual address if the virtual address is mapped to a guest physical address as specified in the guest page table or cached in the virtual TLB. If the virtual address is not mapped, it will not have access to it. If the virtual address access by the VMM is for emulating a guest instruction, it would generate a virtual hardware fault and transition the guest execution to the fault handler.

In embodiments of the present invention, the shim application communicates with the VMM through this hypercall interface. Some hypercalls pass in memory buffer arguments to the VMM, with the intent that the VMM will read from the specified memory buffer, and/or write to it. The hypercall that launches the cloaked mode always passes in the CTC as an argument, therefore, as long as the application is executing in the cloaked mode, the CTC is always accessible by the VMM so that the VMM can write the VCPU context to the CTC when a virtual interrupt or fault occurs.

Figure 13:
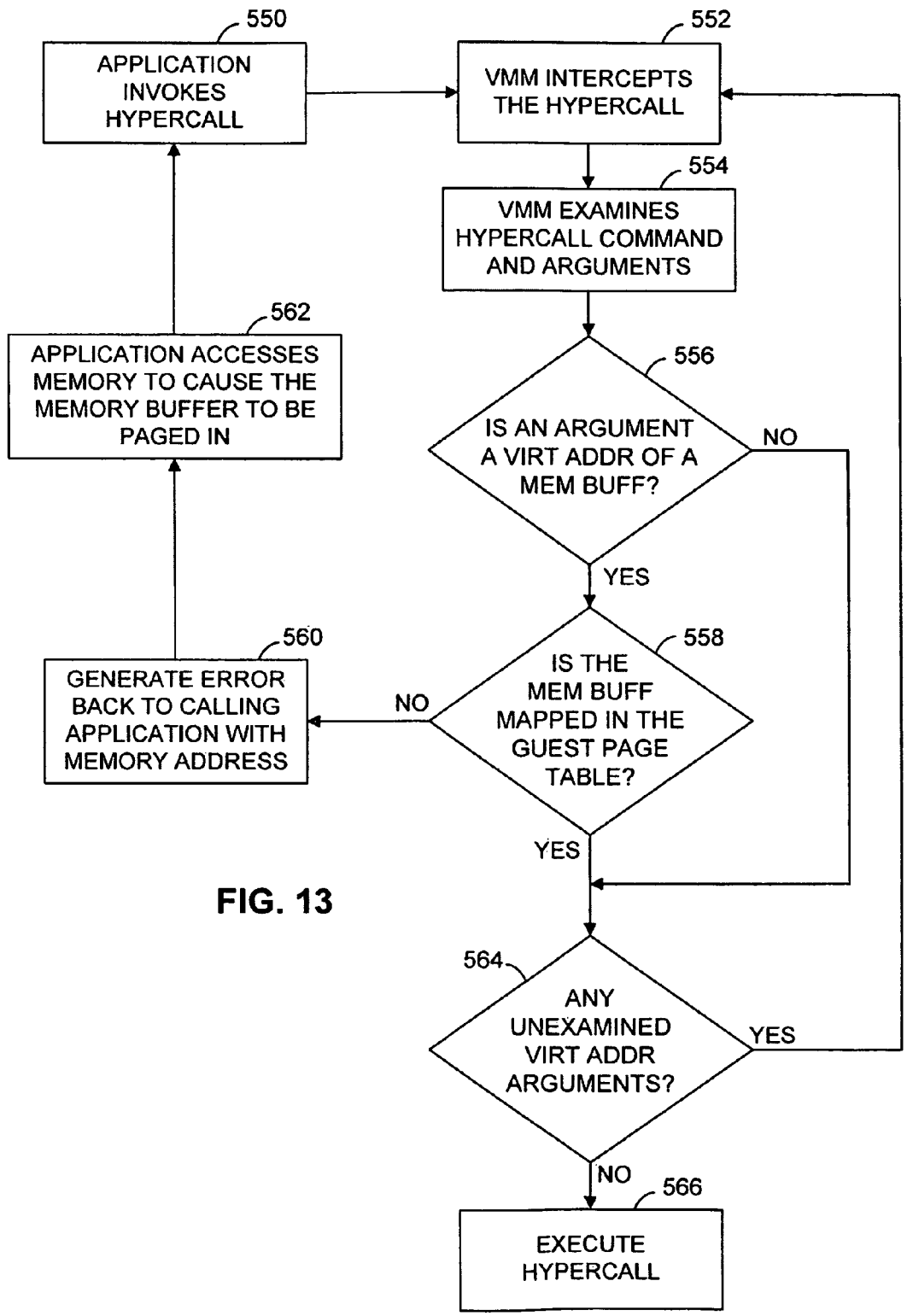
FIG. 13 is a flowchart of the steps for accessing memory in accordance with one embodiment of the present invention.

Referring now to the flowchart of FIG. 13, one embodiment of the present invention provides a method for assuring that a memory buffer needed by a guest application is currently mapped. In this method, when a hypercall is invoked (step 550) by the application, the VMM handles the hypercall by intercepting (step 552) the hypercall instruction and examining (step 554) the VCPU registers to determine the hypercall command and arguments. If (step 556) one or more of the arguments is a virtual address indicating a location of the memory buffer, the VMM checks (step 558) whether or not the memory buffer is mapped in the guest page table. Here, an argument may be a pointer, i.e., a virtual address, to a parameter in memory, not necessarily a specific memory buffer, and the VMM reads the contents of that parameter in memory. Further, the VMM knows which arguments are pointers based on the hypercall command, i.e., the VMM does not depend on the particular value that is passed. There are several possible ways of checking this, for example, the VMM may walk the guest's page table to determine whether an application virtual address is mapped into guest physical memory. With hardware support for nested page tables (NPT), e.g., AMD "NPT" (as known as RVI or Rapid Virtualization Indexing) or Intel "EPT" (Extended Page Tables), the hardware may generate a fault if the guest page table does not have the page mapped. Alternatively, the VMM may try to access the guest virtual address directly using the shadow page table that partially contains guest virtual address mappings to avoid a page walk. In NPT or EPT, such optimization is not possible.

If, at step 558, the VMM finds that the memory buffer is not currently mapped or it does not have the correct permissions to access the memory, the VMM returns an error and the faulting address (step 560) to the hypercall caller through registers, without actually performing the hypercall. The application receiving the error return value then attempts to access (step 562) the memory, which causes a page fault to be delivered to the guest OS. The guest OS resolves the page fault by paging in the page or changing the permission on the page. For example, if the memory was mapped read-only, such as if the memory is copy-on-write, and the VMM needs to write to it, the application would need to write to the memory buffer so that the guest kernel would make the page writeable. Then the application asserts the hypercall to the VMM again (step 550).

Returning now to step 558, if the memory buffer is mapped into a guest page table then control passes to step 564 where it is determined whether or not there are any unexamined virtual address arguments that remain to be processed. If there are, control passes back to step 554, and if not, then the hypercall is executed, step 566.

If, at step 556, an argument is not a virtual address of the memory buffer then control passes to step 564 for processing of the hypercall.

It is possible that a memory buffer may span several pages, or several memory buffers are needed for the hypercall, as passed in arguments either explicitly or pointed to, by elements of data structures in another memory buffer. In such cases, each unmapped page or page without the correct permission would cause the VMM to return an error and the faulting address. After the application resolves all mapping errors, the VMM proceeds to executing the hypercall.

As an alternate approach, according to one embodiment of the present invention, the application may touch each page of a memory buffer immediately before issuing the hypercall to the VMM. Having the application touch each page prior to the hypercall provides some efficiency because doing so may avoid the need to return an error and retry the hypercall. As a virtual interrupt may occur between any two instructions in user-level, however, there is no guarantee that the memory buffer would still be mapped when the hypercall instruction is executed because the guest OS may have swapped it out before resuming execution of the application. Thus, although unlikely, it is possible that multiple faults may be generated on the same address.

In embodiments of the present invention, the CTC is accessible by the VMM while the application is running in the cloaked mode. There is a hypercall that transitions from the uncloaked to cloaked mode, and in executing the hypercall, the VMM makes sure that the CTC is mapped in the current page table. Then and the VMM caches the translation in the virtual TLB. This Caching this translation allows the CTC to continue to be accessible to the VMM as long as the application is running under cloaked mode because, for x86-based systems, the guest cannot flush the virtual TLB on the VCPU without executing a privileged instruction on the same VCPU. If this were to happen, the VMM would either intercept the execution of such ana privileged instruction or detect the change to the TLB as the result of, e.g., a guest TLB flush or invalidation operation. In either event, the VMM is able to determine whether or not a page is still mapped. On a virtual hardware interrupt or fault, the VMM writes the cloaked register states into the CTC and transitions out of the cloaked mode. As a result, the VMM can have multiple accesses, i.e., continue to access the virtual memory while interleaving with the execution of other guest programs, which may or may not touch the same virtual memory. In other words, other programs may execute and such execution will not prevent the VMM from accessing the virtual memory of the cloaked program.

In yet another embodiment, rather than the VMM monitoring TLB activities, the VMM could "pin" a page table entry, for example, the CTC, in the VMM for the virtual address it wants to access. This is a further step because the shadow page table is a cache and, therefore, the translation could be lost, i.e., the translation could be evicted from this cache. The loss of the translation could be problematic in a situation where, for example, operation of another VCPU invalidates the underlying page table entry that maps that virtual address.

Adapting System Calls

Cloaking necessarily changes the way the OS can manage process memory—it cannot modify it or introduce sharing without application help. It also changes the way the OS transfers control—it can only branch to well-defined entry and exit points within the application. Accommodating these changes requires adapting the semantics of a variety of system calls.

Pass-Through and Marshalling

A majority of system calls can be passed through to the OS with no special handling. These include calls with scalar arguments that have no interesting side effects, such as, e.g., getpid, nice, and sync. The shim need not alter arguments to these system calls, so the cloaked shim is bypassed altogether, resulting in control flow as shown in FIG. 11. Note that the VMM itself is not aware of system call semantics; during initialization, the shim indicates which system call numbers can be bypassed.

Many other calls have non-scalar arguments that normally require the OS to read or modify data in the cloaked application's address space, for example, path names and "struct sockaddrs." Such arguments are marshalled into a buffer in the uncloaked shim, and registers are modified so the system call uses this buffer as the new source (or destination) for non-scalar data. After the system call completes, results are copied back into the cloaked application, if necessary.

More Complex Examples

Several system calls require changes to resolve incompatibilities between cloaked semantics and normal OS semantics. There are system calls that require non-trivial emulation which, along with thread creation and signal handling, will be described below.

Emulation

The semantics of several system calls are emulated. For example, the pipe command normally creates a queue in the kernel for communicating bytes. As this command is not easily protected, it is instead emulated with a queue in cloaked shared memory. To preserve the normal blocking semantics of calls such as read, write, and poll, reads and writes are implemented over the pipe as normal, however, with a modification. For the sender, a write sends zeros instead of actual data. For the receiver, zeros are read, then actual data is copied from the protected queue. Emulation is required to support futex (Linux fast mutex), as the normal OS implementation involves direct modification of process memory.

For example, sendfile typically takes two descriptors, one for a file, and the other for a socket, and writes the contents of the former to the latter. This, however, will not work if a file is cloaked in accordance with teachings of the present invention. Instead, the cloaked file is read first, then its contents are written to the socket using normal send calls.

Thread Creation

Handling the clone and fork system calls is related to how the shim manages resources. A "clone" call begins by allocating thread-local storage for the new thread. Next, the child's cloaked thread context CTC is set up by making a copy of the parent's CTC, and fixing all thread-local pointers for the child. Finally, the IP and SP for entering cloaked mode in the child's CTC are changed, arranging for the child to start executing in a "child_start" function located in the child's shim, which will complete its initialization.

Normally, the CTC would be modified by the VMM on a switch from cloaked to uncloaked mode. In this case, however, the child's CTC is not currently being used. Thus, on a clone system call, only the parent's CTC is modified. The uncloaked stack that will be used by the cloned thread, when returning from the system call, is set up so that it will start running the new cloaked context. After returning from the system call, the parent thread returns to the original execution context. The child thread begins execution in child_start, as described above.

Signal Handling

Normal Unix signal-handling semantics are incompatible with cloaking, as the operating system cannot be allowed to transfer control into an arbitrary section of cloaked code. Keeping portions of the shim non-preemptable also simplifies its implementation.

When the application registers a signal handler with signal, the shim emulates it, registering the handler in its own table. All actual signal handlers (those registered with the kernel) use a single handler located in the uncloaked shim. This signal handler makes a hypercall to the VMM immediately upon receiving a signal, indicating which shadow context received the signal, the signal that occurred, and any additional signal parameters.

The VMM examines the cloaked context and checks the signal status to determine in which context the signal occurred: the cloaked shim, uncloaked shim, cloaked application, or other uncloaked code. If the signal occurred when the cloaked application was executing, the VMM transfers control to a well-defined signal entry point in the shim, with relevant signal information. If the signal occurred while the shim was executing, the VMM further checks a flag in the CTC to determine whether to safely rollback execution to the last application system call entry point, or to defer the signal delivery until shim exit, when execution has effectively returned to the application.

File I/O

Files used by cloaked applications, i.e., cloaked files, are encrypted from the view of the guest kernel. As a result, therefore, the kernel file cache contains only encrypted blocks from these cloaked files. Read or write operations to a partial file block cannot be performed inside the guest kernel because a partial encrypted block cannot be decrypted with the exception of using a stream cipher. To provide the level of security that is provided by embodiments of the present invention, however, it would be very difficult to use a strong stream cipher.

Alternatively, an application may access the same file using read and write system calls or through file-backed memory-mapped "mmap regions." Each mmap region is a contiguous portion of the application's virtual address space created via the mmap system call (in Linux) to map memory for application use. The synchronization between encrypted and decrypted views, however, would be expensive if the kernel implements read and write system calls using its encrypted view and the application accesses the file using virtual memory using its decrypted view.

Embodiments of the present invention provide operations for securely processing cloaked file I/O operations—including read and write system calls, as well as some inter-process communication (IPC) operations, such as pipes, by emulating the file I/O semantics in the shim layer with memory-mapped regions using the mmap system call.

Unprotected, i.e., "uncloaked" files, are handled using argument marshalling, while protected files must be adapted to utilize cloaking. Each cloaked file has an associated metadata file, as explained above. On an open call, the shim makes a hypercall to determine if the metadata for its RID is in the VMM's metadata cache MDC. If the metadata is not found, the shim makes a hypercall to allocate an RMD object in the MDC for that RID, reads the entire metadata file and passes its contents to the VMM, which verifies its integrity.

The shim interposes on all I/O-related system calls. Encrypted file I/O for cloaked applications is implemented in the shim using mmap. For example, read and write system calls are emulated by copying data to/from memory-mapped buffers. File data is mapped using the MMAP_SHARED flag, to ensure that other processes that may open the same file obtain a consistent view. By transforming all file I/O into memory-mapped I/O, file data is decrypted automatically when it is read by a cloaked application, and encrypted automatically when it is flushed to disk by the kernel. For efficiency, the shim maintains a cache of mapped file regions; one implementation of the present invention maps regions using 1 MB chunks to amortize the cost of the underlying mmap and munmap calls.

Using mmap for file I/O obviates the need to implement any cryptography in the shim and allows keys and metadata to be managed, in one embodiment of the present invention, solely by the VMM. This implementation avoids the need for maintaining consistency between different views of the same file. Further, with mmap encryption and decryption need only be performed when necessary. In one non-limiting example, the application can read portions of a file repeatedly without causing any additional decryptions. This embodiment of the present invention provides an advantage over an implementation based on the read operation, as data would then need to be decrypted each time it was passed to the application. Similarly, for a write operation, data need only be encrypted when the OS actually flushes it to disk.

It should be noted that even after a cloaked application terminates, some unencrypted file pages may remain in the OS buffer cache, and can be used by other cloaked applications from the same SID.

In one embodiment of the present invention, a single-page header is prepended to each cloaked file. This header contains the actual file size, which may differ from the current on-disk size due to the 1 MB mapping granularity. Each shim using the file maps its header using a shared mmap, to emulate operations such as fstat and lseek. The shim also tracks operations that create or manipulate file descriptors, such as dup, and maintains a table of all open files, their offsets, and whether they are cloaked. This table is kept in a shared anonymous region to properly track and share descriptors across process forks.

It should be noted that certain files may require special treatment. For example, applications need a secure source of randomness for cryptographic purposes, which cannot come from the untrusted OS. This is addressed by transforming accesses to /dev/random with hypercalls for secure randomness.

An implementation of a system in accordance with one or more of the embodiments of the present invention described above supports cloaking for all application memory regions—private and shared, anonymous and file-backed.

An implementation of an embodiment of the present invention can be based on a version of the VMware VMM for 32-bit x86 processors that uses binary translation for guest kernel code. The modified VMM can be built as a VMware Workstation binary running in a "hosted" configuration on top of an existing Linux host OS. Of course, as multi-shadowed memory cloaking does not depend on specific features of the VMware VMM, embodiments of the present invention as described herein could also be realized in other virtualization platforms as is apparent to those of ordinary skill in the art.

One of ordinary skill in the art will understand that minor modifications would be necessary to enable hardware-assist for x86 virtualization, such as Intel VT and AMD SVM. For example, system call transitions between guest user-mode and kernel-mode are trapped by a binary-translating VMM, but are not typically trapped by a hardware-assisted VMM. It is envisioned that hardware support for nested page tables will accelerate many of the operations, improving overall performance. Reducing the cost of hardware context switches is also desirable. For some embodiments of the present invention, the ability to redirect a trap to guest user-mode code makes it possible to redirect system calls to handlers in the shim without dynamic VMM intervention.

Applications

A variety of applications have been run in a system implementing embodiments of the present invention. Cloaking a standard shell like bash or tcsh provides a convenient way to launch other cloaked applications. Most common commands, e.g., ls, ps, df, rm, have been implemented this way as have more complicated console-based tools like mail and traceroute. Shell scripts using simple tools like sed, awk, and grep have been protected, as have scripts in more complicated languages such as Perl and ruby. A variety of web and mail servers have been run with embodiments of the present invention, including Apache, exim and postfix.

Embodiments of the present invention are also able to run a variety of small and large applications; from modest programs like xterm and konsole to larger clients such as Konqueror and Firefox.

Embodiments of the present invention are directed primarily toward software attacks; however, compared to architecture-level approaches, embodiments of the present invention provide substantial flexibility by being software-based and do not require applications and/or the OS to be substantially modified or rewritten. Embodiments of the present invention make integration with unmodified operating systems feasible, and enable sharing between protection domains. Nevertheless, embodiments of the present invention's software mechanisms could be combined with more hardware-centric approaches to provide similar benefits.

According to embodiments of the present invention as described above, a system cryptographically isolates an application inside a virtual machine from the operating system it is running on, offering another layer of protection for application data, even in the face of total OS compromise.

This capability is enabled by multi-shadowing, a novel technique for presenting different views of "physical" memory in virtualized systems. This allows memory to be cloaked, so that it appears normal to an application, but encrypted to the operating system. Cloaking supports a separation of responsibilities for isolation and resource management, allowing the use of complex commodity operating systems to manage application virtual memory and other resources, while relying on a simpler hypervisor to ensure data privacy and integrity.

Design

Embodiments of the present invention target whole-application protection, and the threats that may be directed toward it.

Whole-Application Protection

Embodiments of the present invention implement a system that can be deployed incrementally, and used for diverse applications. Embodiments of the present invention protect entire existing applications in situ in existing commodity operating systems. This approach has several advantages:

Ease of adoption. Previous work on protecting applications required partitioning an application into protected and unprotected parts—forcing developers to modify their applications or port to a new OS. Further, changes to how software is packaged and used may also be required by previous methods.

Support for diverse applications. Solutions for providing higher assurance are often restricted to a limited set of applications or data, such as passwords. Sensitive data, however, is remarkably diverse, from databases of credit card numbers, to files containing medical patient information. Sensitive data in real applications frequently does not lend itself to being placed in a separate container, and restructuring applications is often impractical.

Incremental path to higher assurance. Even after taking the operating system out of the application's trusted computing base, large, complex applications will still have significant assurance concerns. Refactoring applications into more-critical and less-critical pieces running in separate protection domains is ultimately a compelling goal. Embodiments of the present invention provide an incremental path to achieving this, as cloaking can be used for whole application protection as well as fine-grained compartmentalization.

Threat Model

Embodiments of the present invention prevent the guest operating system from reading or modifying application code, data and registers. All non-application access to cloaked data, including DMA from virtual I/O devices, only reveals the data in encrypted form. Data secrecy, integrity, ordering and freshness are protected up to the strength of the cryptography used. If the OS or other hostile code tries to modify encrypted data, the application will fail-stop.

Most applications are not designed with the expectation that the OS is or becomes hostile. Embodiments of the present invention may be used to implement a "trusted path" for user interface devices, as this would provide protection for many applications, including web, email, and VOIP clients. In accordance with teachings of the present invention, user interaction could be protected if the application uses a remote display system that renders to software frame buffers.

Protecting Device Memory.

Many I/O devices present a memory mapped interface to software. For some devices, embodiments of the present invention can be employed to protect the contents of "physical" device memory from being inspected or modified by untrusted software. For example, an interactive VM typically provides a virtual high resolution graphics display that uses a memory-mapped frame buffer. A multi-shadowed frame buffer, in accordance with one or more embodiments of the present invention could implement a trusted path, by ensuring that a cloaked application's output remains private. This approach can be used to prevent the OS from observing raw device memory, and to cloak off-screen display images and other memory used by window managers and graphics subsystems.

Fine-Grained Cloaking.

Further, in accordance with embodiment s of the present invention. Applications can be modified to apply multi-shadowing selectively, i.e., cloaking only sensitive pages. For example, two shadow contexts could be defined for each application: a protected shadow containing cloaked code and data, and an unprotected shadow for uncloaked code and data. In this model, cloaked memory can be accessed only by cloaked code. A shadow context would then be identified by the virtual address of the current instruction pointer.

In order to interpose on transitions between these shadow contexts, a VMM can change the execute permission of pages in the shadow page tables (independent of guest PTE permissions). In the unprotected shadow, all protected pages are marked nonexecutable; similarly, in the protected shadow, all unprotected pages are marked non-executable. When the application branches between protected and unprotected code, the resulting permissions based page fault will trap into the VMM, allowing it to switch between shadow page tables.

Additionally, as provided by embodiments of the present invention, control transfers to and from a cloaked application are only permitted at well-defined entry and exit points through mechanisms such as system calls and signal delivery. Application registers are also protected from the OS, and are securely saved and restored upon entry and exit from an application's execution context. Embodiments of the present invention can also protect information shared between cloaked applications via the file system, shared memory, or other forms of IPC.

The embodiments of the present invention may be implemented on one or more of the VMM products available from VMware of Palo Alto, Calif. Embodiments of the present invention offer an additional layer of defense-in-depth. Advantageously, as its protection model is orthogonal to that of the guest OS, protected applications require no additional privileges.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

What is claimed is:

1. In a computer system comprising a virtual machine monitor (VMM) running on system hardware and supporting a virtual machine (VM) having a first application and a guest operating system (OS) running therein, a method of providing the VMM with access to virtual memory comprising:
the VMM receiving a hypercall from the first application running in the VM;
the VMM determining if it has access to a first virtual memory address identified in the hypercall;
if the VMM determines that it does not have access to the first virtual memory address identified in the hypercall, the VMM returning a first message to the first application with an identification of the first virtual memory address to which the VMM does not have access;
the first application receiving the first message returned from the VMM and implementing an operation to cause the identified first virtual memory address to be accessible by the VMM; and
the first application re-invoking the hypercall to the VMM.

2. The method of claim 1, further comprising:
the first application, in response to the first message, accessing the first virtual memory address,
wherein the first memory address is mapped by a page table entry in a page table to which the VMM has access.

3. The method of claim 2, further comprising:
the VMM determining that it has access to all memory addresses identified in the hypercall; and
the VMM executing the hypercall.

4. The method of claim 2, further comprising:
generating a page fault in response to the first application accessing the first virtual memory address; and
the guest OS resolving the page fault.

5. The method of claim 4, wherein the guest OS resolving the page fault comprises at least one of:
paging in the contents of the page associated with the first virtual memory address; and
changing a permission of a page at which the first virtual memory address is found.

6. The method of claim 1, wherein the VMM determining if it has access to the first virtual memory address comprises:
the VMM determining if the first virtual memory address is mapped by a guest page table.

7. The method of claim 1, wherein the VMM determining if it has access to the first virtual memory address comprises:
the VMM determining that the first virtual memory address is mapped by a guest page table; and
the VMM determining that the first application does not have permission to access the first virtual memory address in the guest page table.

8. The method of claim 1, further comprising:
the VMM determining that it has access to all memory addresses identified in the hypercall;
the VMM executing the hypercall; and
the first application executing in a cloaked mode of operation in response to execution of the hypercall by the VMM.

9. The method of claim 8, further comprising:
the first application ceasing execution in the cloaked mode of operation; and
the VMM storing a state of the first application at the first virtual memory address,
wherein the VMM retains access to the first virtual memory address.

10. The method of claim 9, further comprising:
the VMM monitoring translation lookaside buffer (TLB) operations; and
determining, as a function of the monitored TLB operations, whether or not a page corresponding to the first virtual memory address remains mapped.

11. In a computer system comprising a virtual machine monitor (VMM) running on system hardware and supporting a virtual machine (VM) having a first application and a guest operating system (OS) running therein, a method of providing the VMM with access to virtual memory comprising:
the first application preparing to issue a hypercall to the VMM;
prior to issuing the hypercall, the first application causing a page table to have one or more valid mappings for one or more portions of an address space of the application which the VMM has access to in order for the VMM to process the hypercall; and
the first application issuing the hypercall to the VMM,
wherein the VMM accesses the provided one or more valid mappings to process the hypercall.

12. The method of claim 11, wherein the first application causes the one or more page table entries to be provided by accessing each page of a memory buffer.

13. In a computer system comprising a virtual machine monitor (VMM) running on system hardware and supporting a virtual machine (VM) having a first application and a guest operating system (OS) running therein, a method of providing the VMM with access to virtual memory comprising:
the VMM receiving a hypercall instruction from the first application;

the VMM examining registers corresponding to the hypercall instruction and determining a corresponding hypercall command and one or more hypercall arguments;

the VMM determining if one or more hypercall arguments comprises a first virtual memory address indicating a location of a memory buffer;

if the VMM determines that one or more hypercall arguments comprises a first virtual memory address indicating a location of a memory buffer, the VMM determining if the memory buffer is mapped by a page table to which the VMM has access;

if the VMM determines that the memory buffer is not mapped by the page table, the VMM identifying to the first application the first virtual memory address;

the first application receiving the identification of the virtual memory address from the VMM and implementing an operation to cause the identified virtual memory address to be mapped by the page table and accessible by the VMM; and the first application re-invoking the hypercall instruction to the VMM.

14. The method of claim 13, further comprising:
the first application accessing the first virtual memory address,
wherein the first memory address is mapped by a page table entry in a page table to which the VMM has access.

15. The method of claim 13, wherein the VMM identifies the first virtual memory address to which the VMM does not have access to the first application via one or more registers.

16. The method of claim 13, wherein the VMM determining if the memory buffer is mapped in a page table to which the VMM has access comprises:
the VMM maintaining a list of virtual memory addresses corresponding to the first application to which the VMM has access.

17. The method of claim 16, further comprising:
the VMM walking a page table corresponding to the first application.

18. A computer program product for use with a virtual machine monitor (VMM) running on system hardware and supporting a virtual machine (VM) having a first application and a guest operating system (OS) running therein, the computer program product comprising a non-transitory computer readable medium having computer readable program code embodied thereon for performing a method of providing the VMM with access to virtual memory, the method comprising:
the VMM receiving a hypercall from the first application running in the VM;
the VMM determining if it has access to a first virtual memory address identified in the hypercall;
if the VMM determines that it does not have access to the first virtual memory address identified in the hypercall, the VMM returning a first message to the first application with an identification of the first virtual memory address to which the VMM does not have access;
the first application receiving the first message returned from the VMM and implementing an operation to cause the identified first virtual memory address to be accessible by the VMM; and
the first application re-invoking the hypercall to the VMM.

19. The computer program product of claim 18, the method further comprising:
the first application, in response to the first message, accessing the first virtual memory address,
wherein the first memory address is mapped by a page table entry in a page table to which the VMM has access.

20. The computer program product of claim 19, the method further comprising:
the VMM determining that it has access to all memory addresses identified in the hypercall; and
the VMM executing the hypercall.

21. The computer program product of claim 19, the method further comprising:
generating a page fault in response to the first application accessing the first virtual memory address; and
the guest OS resolving the page fault.

22. The computer program product of claim 21, wherein the guest OS resolving the page fault comprises at least one of:
paging in the contents of the page associated with the first virtual memory address; and
changing a permission of a page at which the first virtual memory address is found.

23. The computer program product of claim 18, wherein the VMM determining if it has access to the first virtual memory address comprises:
the VMM determining if the first virtual memory address is mapped by a guest page table.

24. The computer program product of claim 18, wherein the VMM determining if it has access to the first virtual memory address comprises:
the VMM determining that the first virtual memory address is mapped by a guest page table; and
the VMM determining that the first application does not have permission to access the first virtual memory address in the guest page table.

25. The computer program product of claim 18, the method further comprising:
the VMM determining that it has access to all memory addresses identified in the hypercall;
the VMM executing the hypercall; and
the first application executing in a cloaked mode of operation in response to execution of the hypercall by the VMM.

26. The computer program product of claim 25, the method further comprising:
the first application ceasing execution in the cloaked mode of operation; and
the VMM storing a state of the first application at the first virtual memory address,
wherein the VMM retains access to the first virtual memory address.

27. The computer program product of claim 26, the method further comprising:
the VMM monitoring translation lookaside buffer (TLB) operations; and
determining, as a function of the monitored TLB operations, whether or not a page corresponding to the first virtual memory address remains mapped.

28. A computer program product for use with a virtual machine monitor (VMM) running on system hardware and supporting a virtual machine (VM) having a first application and a guest operating system (OS) running therein, the computer program product comprising a non-transitory computer readable medium having computer readable program code embodied thereon for performing a method of providing the VMM with access to virtual memory, the method comprising:
the first application preparing to issue a hypercall to the VMM;
prior to issuing the hypercall, the first application causing a page table to have one or more valid mappings for one or more portions of an address space of the application which the VMM has access to in order for the VMM to process the hypercall; and the first application issuing the hypercall to the VMM, wherein the VMM accesses the provided one or more valid mappings to process the hypercall.

29. The computer program product of claim 28, wherein the first application causes the one or more page table entries to be provided by accessing each page of a memory buffer.

30. A computer program product for use with a virtual machine monitor (VMM) running on system hardware and supporting a virtual machine (VM) having a first application and a guest operating system (OS) running therein, the computer program product comprising a non-transitory computer readable medium having computer readable program code embodied thereon for performing a method of providing the VMM with access to virtual memory, the method comprising:

the VMM receiving a hypercall instruction from the first application;

the VMM examining registers corresponding to the hypercall instruction and determining a corresponding hypercall command and one or more hypercall arguments;

the VMM determining if one or more hypercall arguments comprises a first virtual memory address indicating a location of a memory buffer;

if the VMM determines that one or more hypercall arguments comprises a first virtual memory address indicating a location of a memory buffer, the VMM determining if the memory buffer is mapped by a page table to which the VMM has access;

if the VMM determines that the memory buffer is not mapped by the page table, the VMM identifying to the first application the first virtual memory address;

the first application receiving the identification of the virtual memory address from the VMM and implementing an operation to cause the identified virtual memory address to be mapped by the page table and accessible by the VMM; and the first application re-invoking the hypercall instruction to the VMM.

31. The computer program product of claim 30, the method further comprising:

the first application accessing the first virtual memory address, wherein the first memory address is mapped by a page table entry in a page table to which the VMM has access.

32. The computer program product of claim 30, wherein the VMM identifies the first virtual memory address to which the VMM does not have access to the first application via one or more registers.

33. The computer program product of claim 30, wherein the VMM determining if the memory buffer is mapped in a page table to which the VMM has access comprises:

the VMM maintaining a list of virtual memory addresses corresponding to the first application to which the VMM has access.

34. The computer program product of claim 33, the method further comprising:

the VMM walking a page table corresponding to the first application.

* * * * *